United States Patent
Kaneko et al.

[11] Patent Number: 5,930,763
[45] Date of Patent: *Jul. 27, 1999

[54] METHOD OF AND SYSTEM FOR ORDER AMOUNT CALCULATION

[75] Inventors: Kuniya Kaneko; Takeshi Fukuyama; Harumichi Wakiyama, all of Toyota, Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/286,843

[22] Filed: Aug. 5, 1994

[30] Foreign Application Priority Data

Aug. 6, 1993 [JP] Japan .................... 5-196270

[51] Int. Cl.$^6$ ................................. G06F 17/60
[52] U.S. Cl. .................... 705/8; 705/7; 364/468.01; 364/468.05
[58] Field of Search ................. 364/401, 402, 364/468, 403, 468.01, 468.05, 468.06, 468.07, 478.01, 478.02, 478.04; 705/7, 8, 28

[56] References Cited

U.S. PATENT DOCUMENTS

| | | | |
|---|---|---|---|
| 4,958,292 | 9/1990 | Kaneko et al. | 364/468 |
| 4,972,318 | 11/1990 | Brown et al. | 364/403 |
| 5,128,861 | 7/1992 | Kagami et al. | 364/403 |
| 5,214,588 | 5/1993 | Kaneko et al. | 364/468 |
| 5,231,567 | 7/1993 | Matoba et al. | 364/401 |
| 5,278,750 | 1/1994 | Kaneko et al. | 364/401 |
| 5,327,340 | 7/1994 | Kaneko et al. | 364/401 |

FOREIGN PATENT DOCUMENTS 2 216 691  10/1989  United Kingdom .

OTHER PUBLICATIONS

Patent Abstracts Of Japan, vol. 12, No. 473, Dec. 12, 1988 & JP–A–63 192159 (NEC Software Ltd), Aug. 9, 1988.
Patent Abstracts Of Japan, vol. 11, No. 252, Aug. 15, 1987 & JP–A–62 057060 (Toshiba Corp) Mar. 12, 1987.
Eleventh IEEE/CHMT International Electronics Manufacturing Technology Symposium (CAT. No. 91CH3043–7), San Francisco, CA, USA, Sep. 16–18, 1991, ISBN 0–7803–0155–2, 1991, New York, NY, USA, pp. 134–137; M. Mori et al.: *Pull Logic Manufacturing Based on CIM to Approach JIT.*

*Primary Examiner*—Emanuel Todd Voeltz
*Assistant Examiner*—Alexander Kalwowski
*Attorney, Agent, or Firm*—Kenyon & Kenyon

[57] ABSTRACT

An order amount of parts can be calculated from an actually used amount of the parts, so that the used parts can be resupplied subsequently. An order amount can also be calculated form a production plan, so that the parts necessary to meet the plan can be delivered.

In this technique, an order amount is calculated by the equation "$W1 \cdot X1 + W2 \cdot X2$", where X1 is the order amount calculated in a subsequently resupplying way, X2 is the order amount calculated in a plan correspondence way, W1 is an actual weight, and W2 is a plan weight. The actual weight W1 becomes high and the plan weight W2 becomes low when the subsequently resupplying way is suitable, and vice versa. The actual weight W1 and the plan weight W2 can be calculated from experience or system analysis.

27 Claims, 21 Drawing Sheets

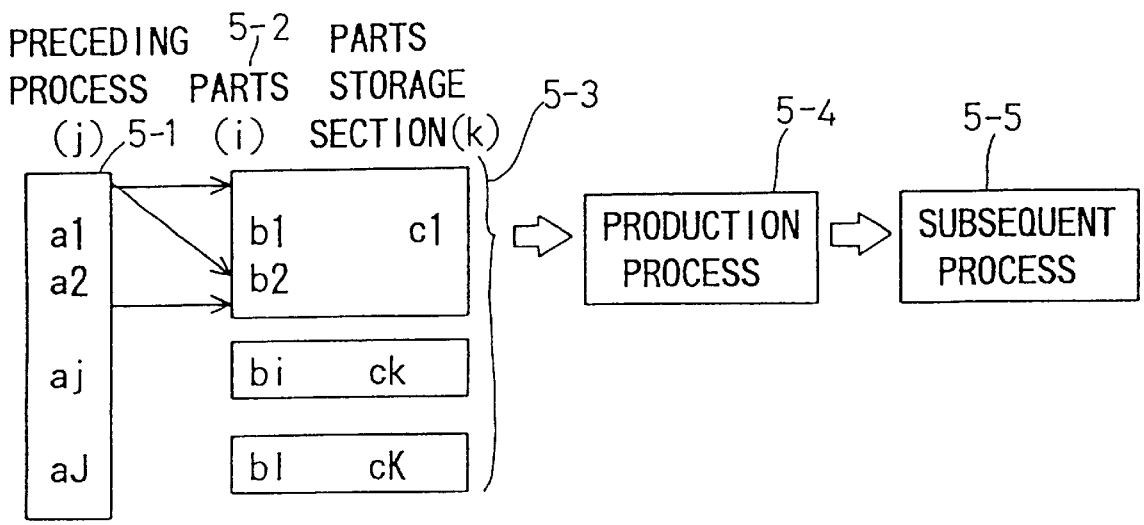
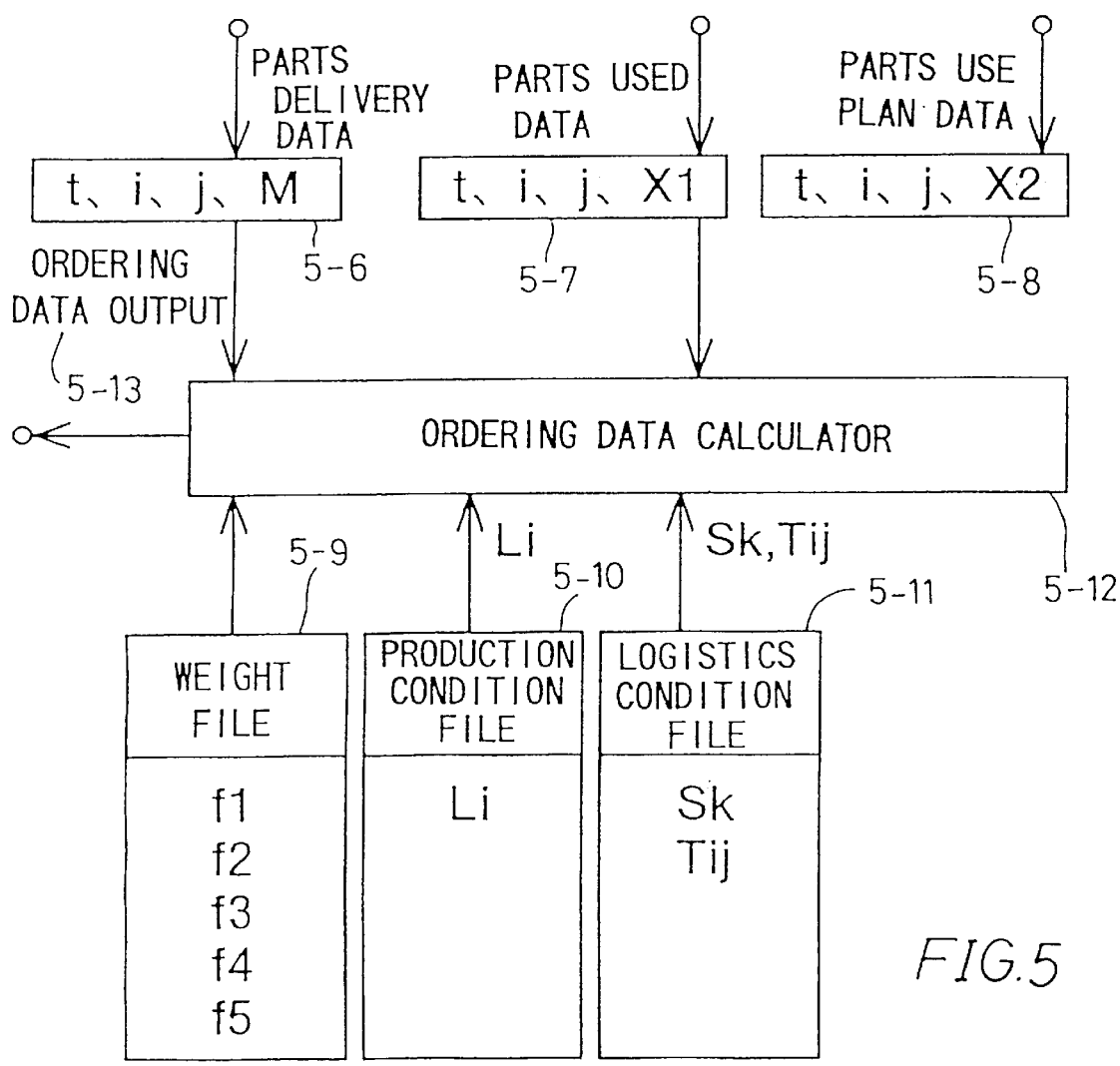
FIG.5

PARTS DELIVERY DATA

| t DELIVERY TIME | i KIND OF PARTS | j PRECEDING PROCESS | M DELIVERY AMOUNT | l PARTS NUMBER |
|---|---|---|---|---|
| ⋮ | ⋮ | ⋮ | ⋮ | ⋮ |

PARTS USED DATA

| t TIME OF USE | i KIND OF PARTS | j PRECEDING PROCESS | X1 ACTUALLY USED AMOUNT | l PARTS NUMBER |
|---|---|---|---|---|
| ⋮ | ⋮ | ⋮ | ⋮ | ⋮ |

PRODUCTION CONDITION

| i<br>KIND OF<br>PARTS | Li<br>USE LOT<br>AMOUNT | T*<br>USE<br>PROHIBITION DAY |
|---|---|---|
| ⋮ | ⋮ | ⋮ |

*FIG.11*

LOGISTICS CONDITION

| k<br>STORAGE<br>SECTION | i<br>KIND<br>OF PARTS | j<br>PRECEDING<br>PROCESS | S<br>STORAGE<br>CAPACITY | T<br>ORDERING<br>-DELIVERY<br>TIME |
|---|---|---|---|---|
| ⋮ | ⋮ | ⋮ | ⋮ | ⋮ |

*FIG.12*

PARTS USE PLAN DATA

| i<br>KIND<br>OF PARTS | j<br>PRECEDING<br>PROCESS | t<br>TIME | X2<br>USE PLAN<br>AMOUNT |
|---|---|---|---|
| ⋮ | ⋮ | ⋮ | ⋮ |

*FIG.13*

$$\{V_{ij}\}_g^{g+c} = \sum_{m=1}^{c+1}\left(\left(\int_{g-m}^{g-m+1} X1_{ij}dt - \int_{g+c+1-m}^{g+c+2-m} X1_{ij}dt\right)^2\right) \quad \cdots(1)$$

$$= (X1_g - X2_{g+c})^2 + (X1_{g-1} - X2_{g-1+c})^2 + \cdots \\ \cdots + (X1_{g-c} - X2_{g+1})^2 \quad \Big\} -(2)$$

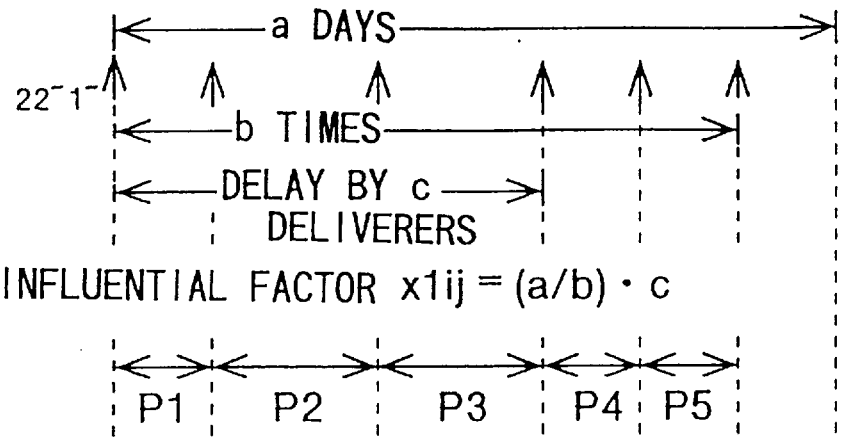

1ST INFLUENTIAL FACTOR $x1ij = (a/b) \cdot c$

2ND INFLUENTIAL FACTOR $\quad x2ij = \sum_{m=1}^{b}\left(Pm - \dfrac{\sum_{n=1}^{b}Pn}{b}\right)^2 \quad \cdots(3)$ 3RD INFLUENTIAL FACTOR $\quad x3ij = \sum_{m=1}^{b}\left(Qm - \dfrac{\sum_{n=1}^{b}Qn}{b}\right)^2 \quad \cdots(4)$

4TH INFLUENTIAL FACTOR

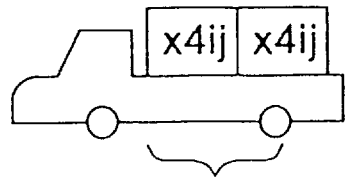

5TH INFLUENTIAL FACTOR $x5ij$

6TH INFLUENTIAL FACTOR (bi)(bi)$\cdots$(bi) $\longrightarrow$ PRODUCTION PROCESS
$\underbrace{\phantom{(bi)(bi)\cdots(bi)}}_{x6ij}$ 7TH INFLUENTIAL FACTOR $\underset{g-1 \quad g}{\longmapsto}$ DELIVERER INTERVAL $x7ij = \left(\int_{g-1}^{g} X2ij\,dt - \int_{g-1}^{g} X1ij\,dt\right)^2 \cdots(5)$ 8TH INFLUENTIAL FACTOR $x8ij = \sum_{m=0}^{c}\left(Em - \dfrac{\sum_{n=1}^{b}En}{b}\right)^2 \quad \cdots(6)$

$$W = \frac{1}{\sqrt{2\pi}\,\sigma} e^{-\frac{H-\mu^2}{2\sigma^2}} \quad \cdots(26)$$

$\sigma$ : STANDARD DIFFERENCE OF H $\mu$ : AVERAGE OF H

METHOD OF AND SYSTEM FOR ORDER AMOUNT CALCULATION

BACKGROUND OF THE INVENTION

1. Field of the Invention

This invention relates to a technique of calculating an order amount in a process of producing products to be utilized in subsequent processes by using parts delivered from preceding processes, such that the parts to be delivered from the preceding processes are neither excessive nor insufficient.

2. Description of the Prior Art

A proposed technique of managing the order amount is disclosed in Japanese Laid-Open Patent Publication No. 62-57060. In this technique, a stock amount detector is provided to detect the amount of stock of parts in a space in which parts delivered from preceding processes are stored. When the detected stock amount becomes less than a reference stock amount, the shortage amount is ordered. The technique is a way of subsequently resupplying used parts.

Another technique which calculates the order amount by an MRP (Material Requirement Planning) system is disclosed in Japanese Laid-Open Patent Publication No. 63-192159. In this technique, when a product production plan is given, parts order amounts are determined from the given product production plan and such data as the parts list of the product and delivery term of the parts, etc. This technique may be called a plan correspondence system.

According to the technique of the subsequently resupplying system, in demand variation periods, the parts to be delivered may be excessive or insufficient. In production increase periods, parts are liable to be insufficient, which may lead to the stoppage of the production line. In production reduction periods, the parts to be delivered may be excessive, giving rise to excessive stock. There is a further problem that no measure is prepared to restore the normal stock state from the excessive stock.

In the plan correspondence system, when calculating the order amount, there is a possibility of failure of accord between the production plan and the actual demand because the production plan is determined on the basis of the future demand forecast. Besides, once the production plan fails to be observed due to such cause as a trouble in the production or distribution facilities, over-stock or insufficient stock of parts is brought about, and there is no means prepared for making up for the over-stock or insufficient stock of parts once brought about.

SUMMARY OF THE INVENTION

The present invention is predicated in a development of a new order amount calculation technique, which utilizes merits and overcomes demerits of the subsequently resupplying and plan correspondence systems, and it seeks to permit adequate parts delivery amount control.

FIG. 1 schematically shows the technique according to the invention. As shown, the technique concerns the calculation of the amount of parts 1-2 to be ordered to a preceding process 1-1 from a self-process 1-3 which produces product 1-4 to be utilized in a subsequent process 1-5. The self-process 1-3 produces the product 1-4 by using the parts 1-2 delivered from the preceding process 1-1. Any of the process in the chain of processes may be treated as the self-process 1-3 in the present invention.

The calculation method according to one aspect of the invention comprises a step 1-6 in which the amount of parts 1-2 having been used in the self-process 1-3 after the last ordering to the preceding process 1-1 is detected, and a step 1-7 in which the use plan amount of parts 1-2 which will have been used between the time of ordering and a future instant after the time required from the ordering till the delivery of parts is calculated. Subsequently, a step 1-8 is executed in which the amount of parts 1-2 to be ordered to the preceding process 1-1 is determined by using both the actually used amount X1 detected in the step 1-6 and the use plan amount X2 calculated in the step 1-7.

Preferably, in the step 1-8, the order amount is determined as (W1·X1+W2·X2) (step 1-9), where X1 is the value detected in the step 1-6, X2 is the value calculated in the step 1-7, W1 is an actual weight, and X2 is a plan weight. The weights W1 and W2 may be selected in advance on the basis of the past experiences, or they may be determined in a manner to be described later.

The actual weight W1, as schematically shown in FIG. 2, can be determined according to at least one of such factors as stock capacity 2-5 (amount of parts that can be stored) of a parts stock space 2-2 in the self-process 1-3, stock time 2-6 (time from the delivery of parts till the use thereof), delivery lot amount 2-1 and use lot amount 2-3 (step 2-7). The actual weight is determined in dependence of the fact that the adaptability of the subsequently resupplying system is different, for instance, when the stock capacity 2-5 is sufficiently redundant and otherwise. When the actual weight W1 is determined, the plan weight W2 is determined as (1−W1). It is possible to determine the plan weight W2 first from the stock capacity 2-5 or the like and then determine the actual weight W1 as (1−2).

It is further possible to determine the actual weight W1 in a method as schematically shown in FIG. 3. In this method, a difference index V is first calculated (step 3-1). The difference index V represents the extent of difference between the detected actually used amount X1 detected in the used parts amount detection step (step 1-6 in FIG. 1) and the use plan amount X2 calculated in the step 1-7 in FIG. 1. The difference index V represents the extent of difference between two kinds of order amounts, one of which is calculated by the subsequently resupplying system and the other of which is calculated by the plan correspondence system.

The difference index is closely related to influential factors. The influential factors, as exemplified at 3-4, include time from the ordering till the delivery of parts, uniformity of the parts delivery interval, delivery lot amount, use lot amount, difference between the amount of parts actually used and the use plan amount, and uniformity of label recovery interval. At least one of these influential factors may be adopted as such. Further, depending on circumstances, it is possible to adopt the safety factor, defective quality case number and facility shortage as influential factors.

There is a causal relationship between the influential factor or factors and the difference index. Accordingly, an approximate relationship which approximates this causal relationship is determined through analysis (step 3-2 in FIG. 3).

When the relationship of the influential factor or factors to the difference index has been analyzed, it is now possible to determine the actual weight W1 according to the approximate relationship (step 3-3). When the actual weight has been determined in this way as well, the plan weight is determined, and further the order amount is determined. Again in this case, it is possible to determine the plan weight first from the approximate relationship and then determine the actual weight.

When the approximate relationship that holds between the influential factor or factors and the difference index is obtained analytically, the actual weight is preferably obtained through the process comprising the steps 3-5 to 3-7 shown in FIG. 3. In this method, an estimated difference index is calculated, which is estimated from the approximate relationship thus obtained and the present influential factor or factors (step 3-5). Then, the estimated stock amount is calculated by providing the estimated difference index to the present stock amount, the detected used amount and the past actual order amount (step 3-6). When the estimated stock amount has been calculated, it is compared to the stock capacity to calculate the evaluation value H (step 3-7). The evaluation value H well corresponds to the adaptabilities of the subsequently resupplying and plan correspondence systems, and the actual and plan weights W1 and W2 can be determined from the evaluation value H.

Further, as schematically shown in FIG. 4, the method according to the invention can be carried out with a system which calculates the order amount of parts 4-2 to be ordered to the preceding process 4-1 from the self-process 4-3 producing the product 4-4 to be utilized in the subsequent process 4-5 by using the parts 4-2 delivered from the preceding process 4-1. This order amount calculation system comprises a unit 4-6 for detecting the amount X1 of parts 4-2 actually used in the self-process 4-3 after the last ordering to the preceding process 4-1, a unit 4-7 for calculating the use plan amount X2 of parts 4-2 at a future instant after the time required from the ordering till the delivery, a unit 4-8 for storing the actual and plan weights W1 and W2, and a unit 4-9 for calculating the order amount by adding the product (W2·X2 of the calculated use plan amount X2 and the plan weight X2 to the product W1·X1 of the detected actually used amount X1 and the actual weight W1. The sum of the actual and plan weights is set to unity.

In the method schematically shown in FIG. 1, the actually used amount X1 of the parts 1-2 is detected in the step 1-6. This amount is equal to the order amount in the subsequently resupplying system. Meanwhile, in the step 1-7, the use plan amount X2 is calculated which corresponds to the use plan amount at a future instant after the time required from the ordering till the delivery. This amount is equal to the order amount in the plan correspondence system.

In this method, the order amount is determined from the considerations of both the order amount based on the subsequently resupplying system and that on the basis of the plan correspondence system. It is thus possible to make up for the deficiencies of both the subsequently resupplying and plan correspondence systems.

Particularly, where the formula of W1·X1+W2·X2 is adopted for the order amount determination as in the step 1-9, the order amount is determined with both the adaptability of the subsequently resupplying system and that of the plan correspondence system taken into considerations.

Further, since the adaptability of the subsequently resupplying system is dependent on the stock capacity 2-5, stock time 2-6, delivery lot amount 2-1, use lot amount 2-3, etc., as shown in FIG. 2, once the actual weight W1 is determined according to at least one of these factors, the actual and plan weights W1 and W2 which are adequate for the actual circumstances are determined.

In the method as schematically shown in FIG. 3, after obtaining the difference index representing the extent of difference between the order amount based on the subsequently resupplying system and that based on the plan correspondence system, the approximate relationship between the difference index and the factor or factors influential thereto is determined, and the actual and plan weights are determined through analysis of how the influential factor or factors are influencing the difference index. That is, the order amount is determined after determination of the optimum weight for each cite of operation.

There are various conceivable influential factors. Where at least one of such factors as the time required from the ordering till the delivery of parts, uniformity of the parts delivery interval, delivery and use lot amounts, difference between the actual use and use plan amounts of parts and uniformity of the label recovery interval are adopted as influential factors, the relationship between the influential factor or factors and the difference index is clarified, which is advantageous for correct determination of the actual and plan weights.

When the approximate relationship between the influential factor or factors and the difference index has been analytically determined (step 3-2 in FIG. 3), an estimated difference index is estimated in step 3-5. In this step 3-5, the difference index is estimated on the basis of the actual influential factor or factors. This estimated difference index corresponds to an estimated difference of the order amount of parts from the plan amount at the time of the delivery. When the estimated difference index has been calculated, the estimated stock amount is calculated as (actual stock amount)+(past order amount−used amount)+(estimated difference index) (step 3-6). When the estimated stock amount is calculated, an evaluation value is calculated according to the estimated stock amount and the stock capacity (step 3-7). The actual weight is determined according to the evaluation value (step 3-3).

In this method, the adaptability to the subsequently resupplying system is obtained from the relation between the estimated stock amount and the stock capacity (amount of parts that can be stored), and the corresponding actual weight is determined. Thus, the actual and plan weights are calculated, which are adaptable to the actual circumstances.

The method described before in connection with FIG. 1 is automatically carried out by a system as schematically shown in FIG. 4. The order amount is calculated with both the subsequently resupplying and use plan correspondence systems taken into considerations.

BRIEF DESCRIPTION OF THE DRAWINGS

FIG. 5 is a schematic view showing a first embodiment of the system according to invention mainly in connection with the flow of matter and data;

FIG. 11 is a schematic view showing production condition data;

FIG. 12 is a schematic view showing logistics condition data;

FIG. 13 is a view showing parts use plan data;

FIG. 22 is a schematic view showing influential factors;

DETAILED DESCRIPTION OF THE PREFERRED EMBODIMENTS

First Embodiment

Figure 1:
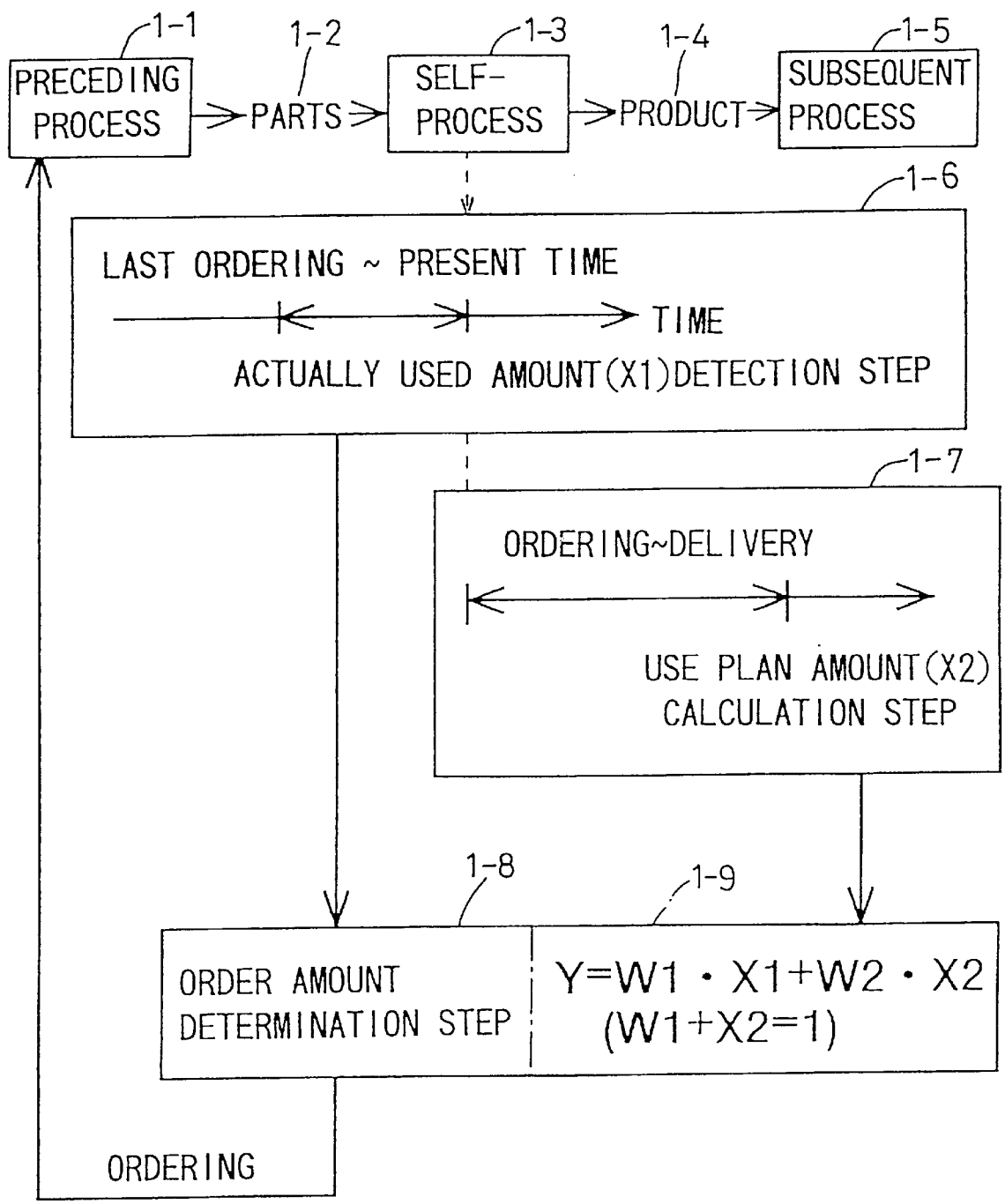
FIG. 1 is a schematic view showing one aspect of the invention.
Figure 2:
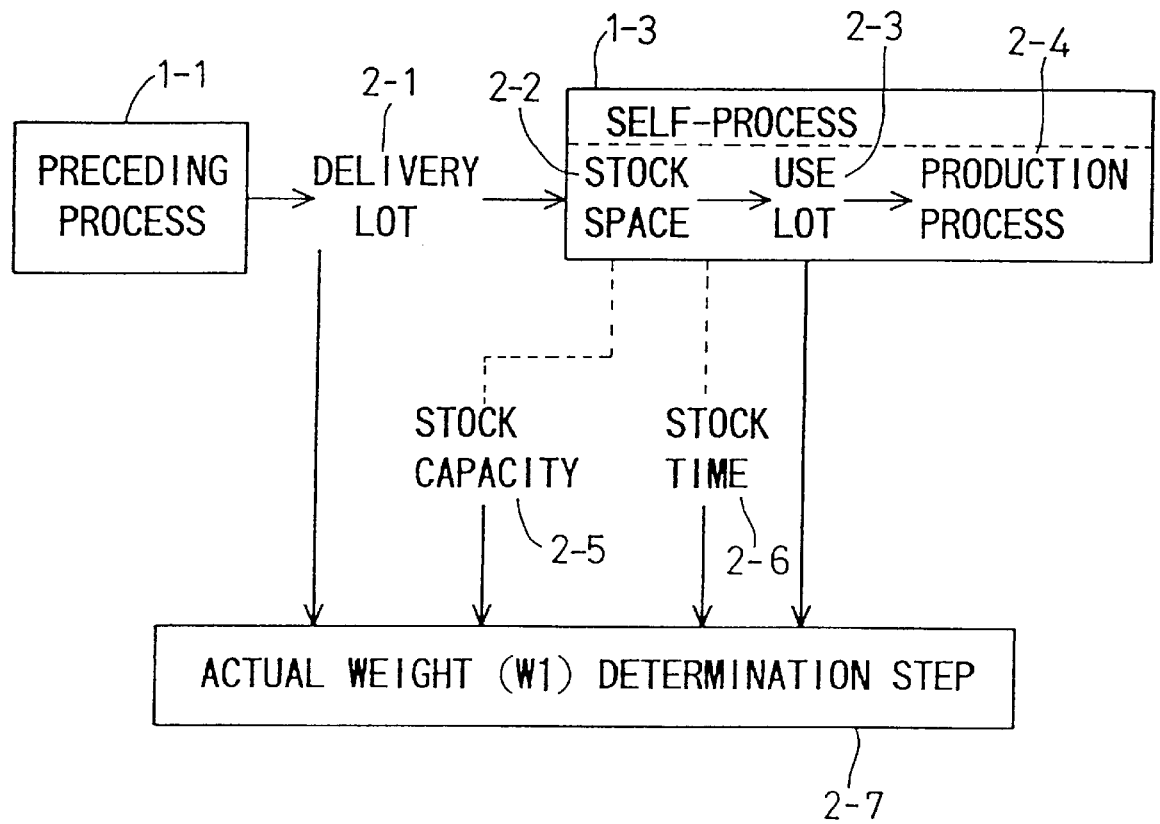
FIG. 2 is a schematic view showing a manner of determining actual weight.
Figure 3:
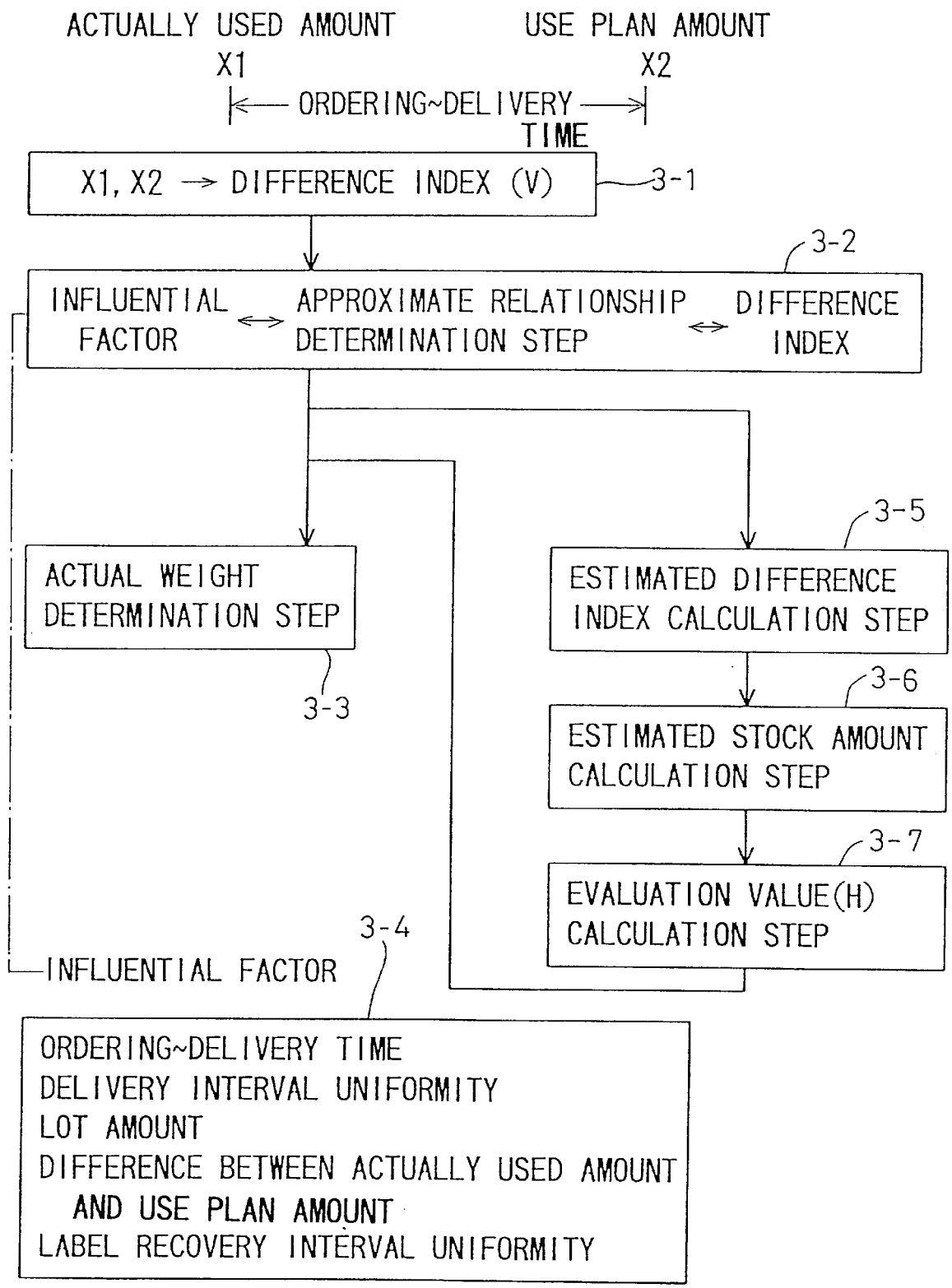
FIG. 3 is a schematic view showing a different aspect of the invention.
Figure 4:
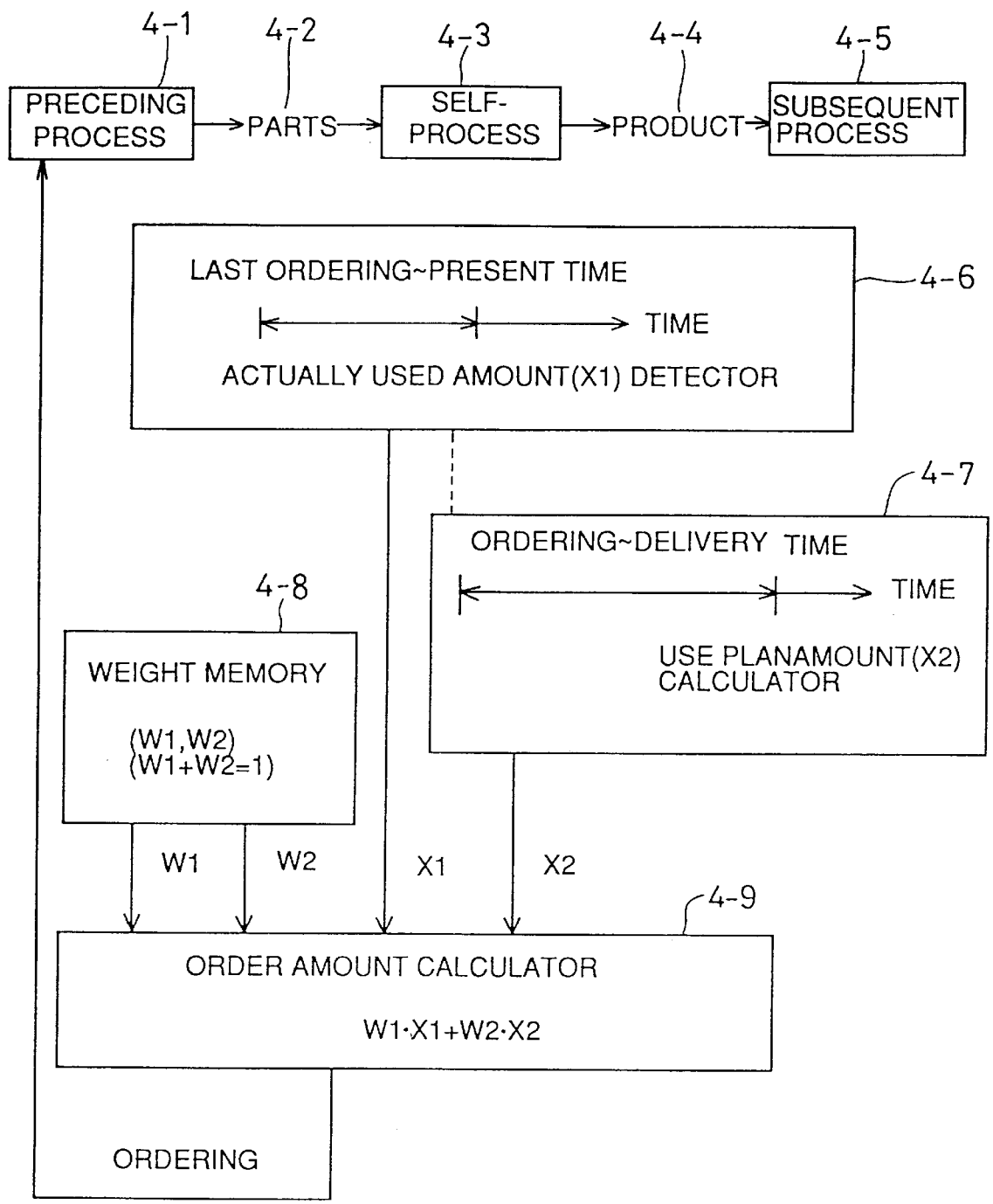
FIG. 4 is a schematic view showing the concept underlying a system according to the invention.

FIG. 5 shows a production system incorporating an embodiment of the invention. The production system comprises a plurality of preceding processes aj (j=1 to J). The preceding processes aj here cover all the processes which deliver parts to a self-process. When parts are supplied from a parts manufacturer, the parts manufacturer is a preceding process. Some of these preceding processes may also be referred to as suppliers.

The self-process produces products to be utilized in a subsequent process 5-5 by using parts i (i=1 to I) delivered from the preceding processes aj (j=1 to J). One kind of parts may be manufactured in two or more preceding processes (for example, parts b2 are manufactured in the preceding processes a1 and a2). On the other hand, two or more different kinds of parts may be manufactured in a single preceding process (for example, two different kinds of parts b1 and b2 are manufactured in the preceding process a1).

In the self-process, a parts storage 5-3 and a production process 5-4 are provided. The parts storage 5-3 includes parts storage sections ck (k=1 to K), some of which store two or more different kinds of parts (parts storage section ci storing parts b1 and b2) while others exclusively store only a single kind of parts (parts storage section ck storing only parts bi). The parts bi (i=1 to I) that are delivered from the preceding processes are tentatively stored in the parts storage sections ck (k=1 to K) before they are fed out to the production process 5-4.

In this production system, the order and delivery of parts and circulation thereof are maintained by using cards called labels (kanban). The labels are transported, in general, together with vessels accommodating parts. On the labels are described the preceding process and the self-process, and data such as kinds of parts and delivered lot amounts. The data may be described as characters that can be understood by operators, or described as bar codes to be read out by a bar code reader.

When a label is delivered together with parts bi from a preceding process aj, it is read out by a bar code reader to obtain parts delivery data. When the delivered parts are used up so that the parts accommodation vessel becomes empty, the label is recovered. At this time, the label is read out again by the bar code reader to obtain parts used data. The label recovery interval is usually set to be shorter than the interval of delivery of parts. The recovered label is returned to the preceding process when a deliverer which delivered parts from the preceding process is returned to the preceding process. At this time, the returned label is treated as one having an order to the preceding process. That is, the amount of parts specified by the returned label is ordered to the preceding process. Thus, the preceding process prepares the specified amount of parts and delivers these parts together with the label. With such label management, the circulation of the ordering, delivery and use of parts is maintained.

The flow of label is specified as data a-b-c. The data a-b-c indicates a delivery circulation or cycle in which ordered parts are delivered b times in a days with a delay of c deliverers.

Where all the recovered labels are returned to the preceding process before the delivery of parts, a perfect subsequently resupplying system is realized. On the other hand, where labels corresponding to a use plan amount of parts which are to be used from the instance of delivery with a delay of c deliverers till the instant of delivery with a delay of (c+1) deliverers, are returned to the preceding process, parts delivery in the plan correspondence system is realized. The label need not be a physical card, but it may be any information carrying medium. It is possible to maintain similar delivery circulation by transmitting data similar to the label data to the preceding process via a data communication line. This embodiment concerns a case of transmitting label information to the preceding process via a data communication line. In this case, on the side of the preceding process, physical labels are issued according to the label information and are delivered together with parts. When parts are delivered, the data of the physical label is read out to obtain parts delivery data, and after use of the parts, the data of the physical label is read out to obtain parts used data. Where the ordering is done with physical labels, it is possible to make effective use of the technique of this embodiment.

In this embodiment, a single ordering data calculator 5-12 is provided for a single self-process. The parts delivery and used data 5-6 and 5-7 read out by the bar code reader are inputted to the ordering data calculator 5-12. To the ordering data calculator 5-12 is further inputted parts use plan data 5-8. The parts use plan data 5-8 represents a predetermined amount of parts that are estimated to be necessary for use in each predetermined period in the self-process to meet a production plan given to the subsequent process 5-5. This will be described later in detail.

To the ordering data calculator 5-12 are connected a weight file 5-9, a production condition file 5-10 and a logistics condition file 5-11. It is possible to read out data stored in these files.

Figure 6:
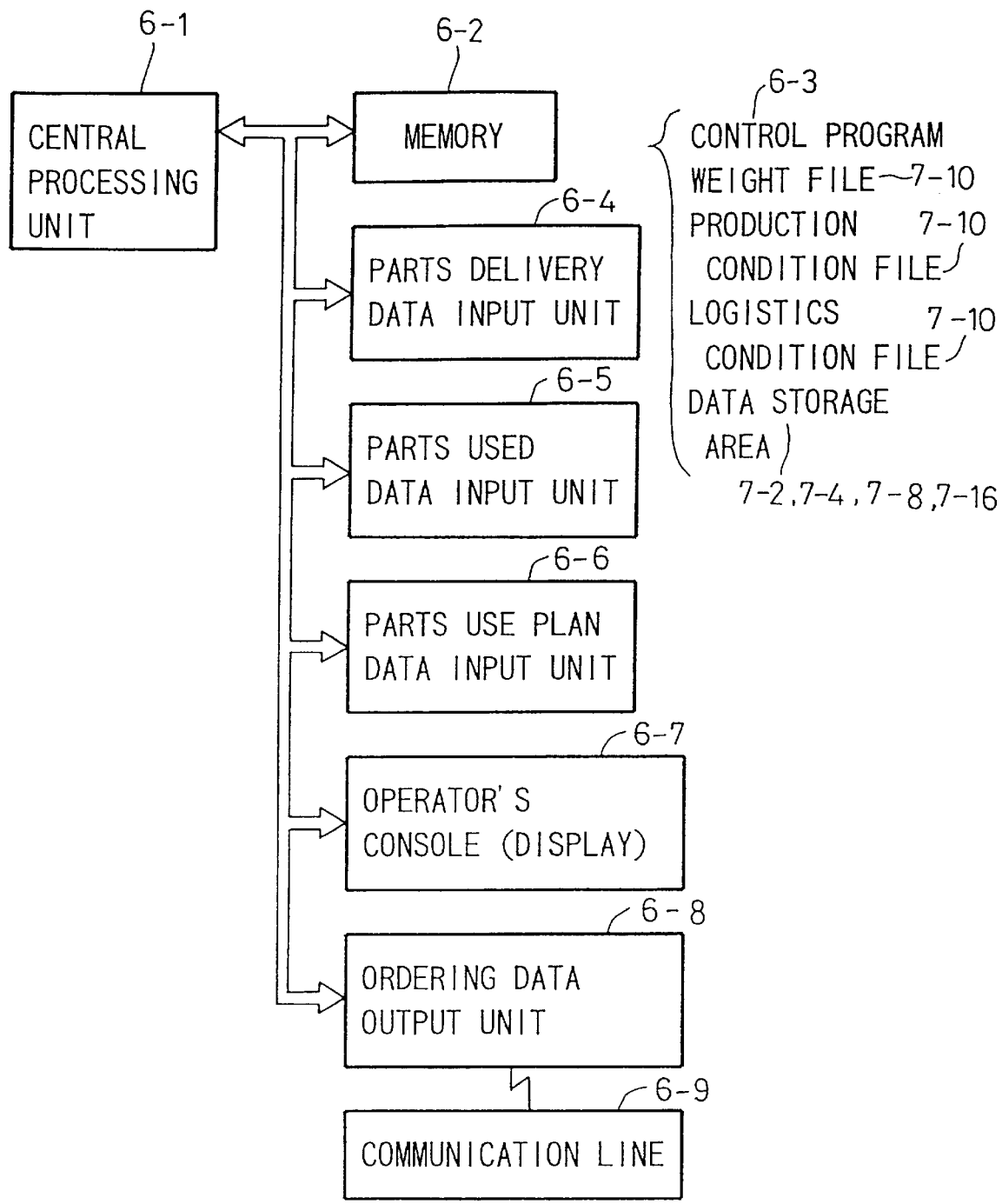
FIG. 6 is a view showing the hardware structure of a computer system constituting the first embodiment of the system.

FIG. 6 shows a computer system constituting the ordering data calculator 5-12. The system is comprised of a central processing unit 6-1 as a main component a memory 6-2, a parts delivery data input unit 6-4, a parts used data input unit 6-5, a parts use plan data input unit 6-6, an operator's console with display 6-7, and an ordering data output unit 6-8 for outputting ordering data to a communication line 6-9. The communication line 6-9 is connected to the preceding processes aj (j=1 to J). In the memory 6-2, process execution programs to be described later, weight file, production condition file, logistics condition file and data storage areas are prepared.

Figure 7A:
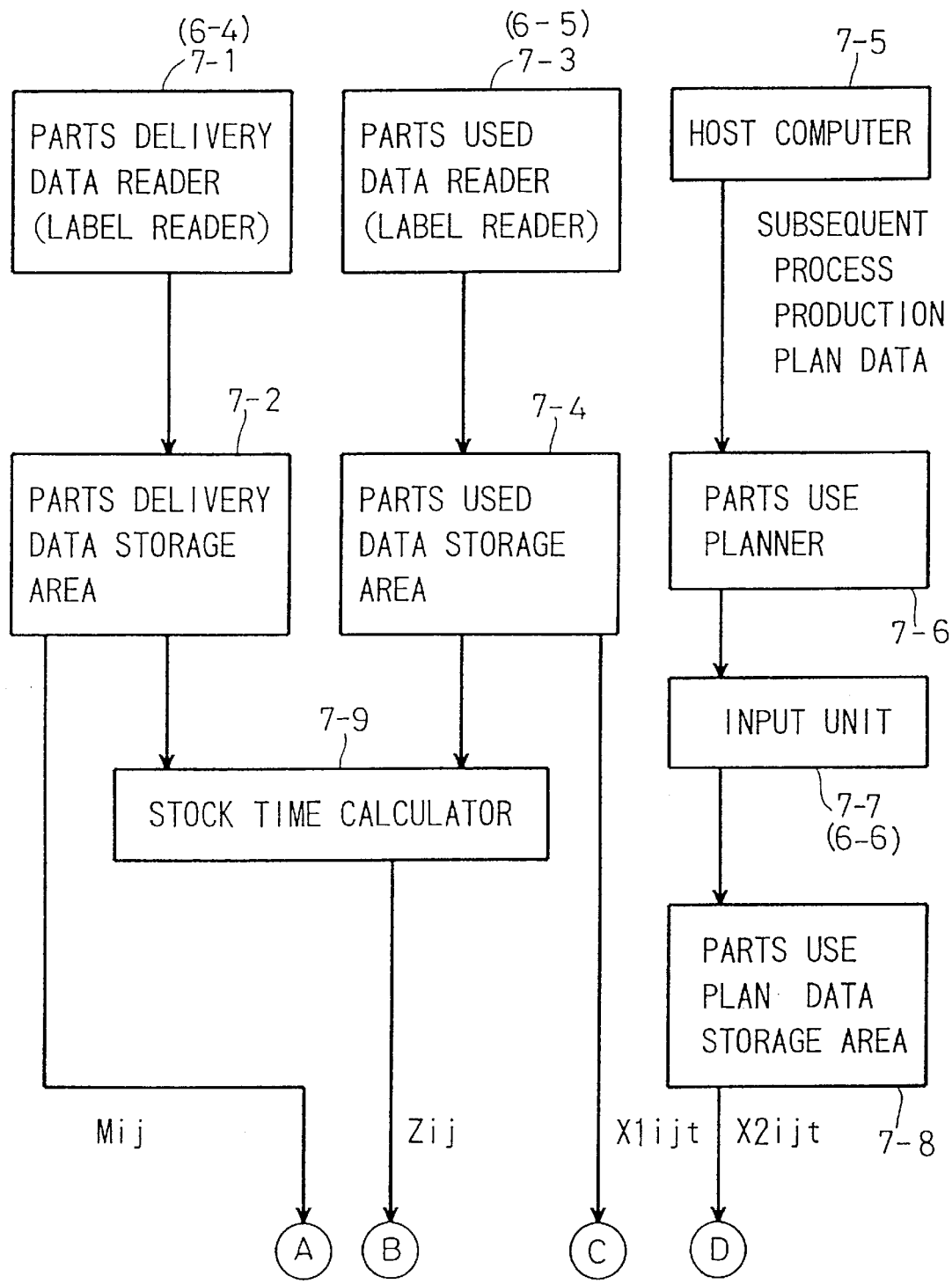
FIGS. 7(A) and 7(B) are a block diagram showing the construction and functions of the first embodiment of the system.
Figure 7B:
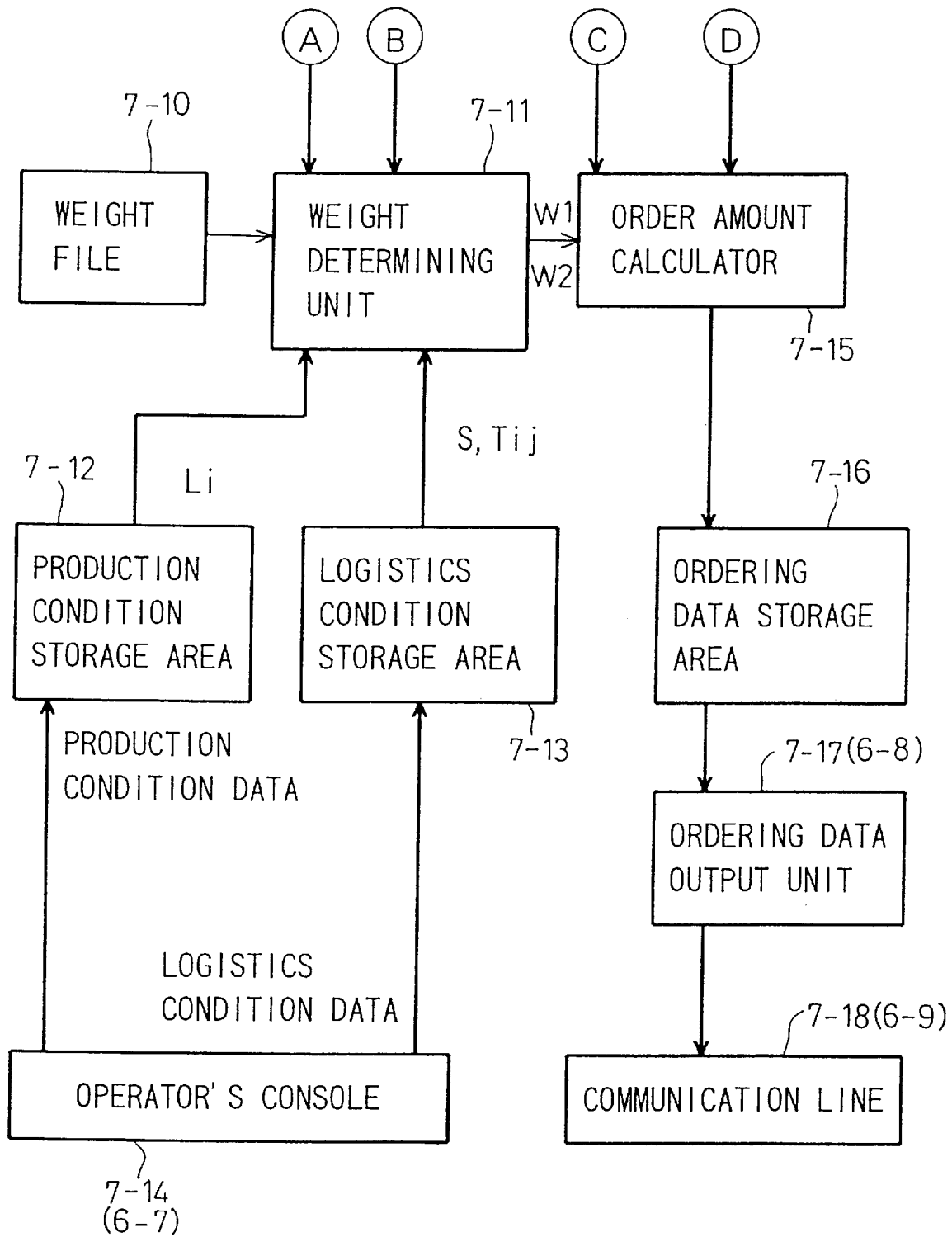

FIGS. 7(A) and 7(B) are a block diagram showing, with respect to functions, the computer system constituting the ordering data calculator 5-12. Reference symbols used to designate parts in the hardware system shown in FIG. 6 are also given.

Figures 8, 9, 10:
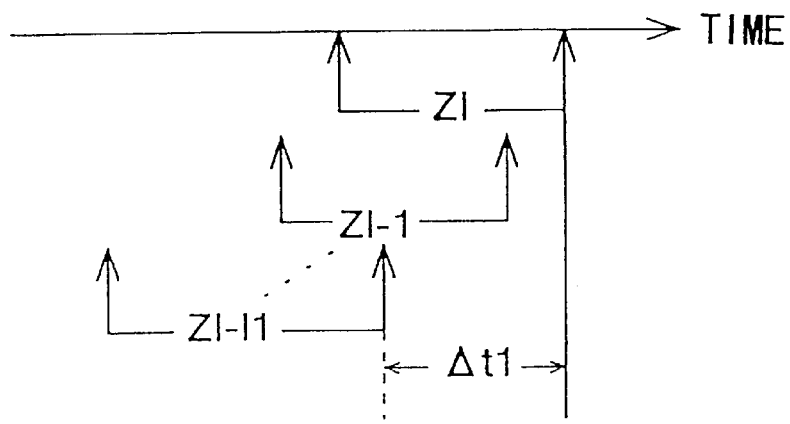
FIG. 8 is a view showing the contents of delivery data.
FIG. 9 is a view showing the contents of used data.
FIG. 10 is a schematic view showing the concept of stock time.

The parts storage sections ck (k=1 to K) shown in FIG. 5 are each provided with a bar code reader called label reader, which reads out data of a label delivered together with parts. This label reader constitutes a parts delivery data reader 7-1 (or 6-4 in FIG. 6). FIG. 8 shows parts delivery data that is read out. The data relates together the kind i of delivered parts, the preceding process j that have delivered the parts, the amount M of the delivered parts, and the delivered time t thereof. The delivered parts are provided with serial numbers for each kind i of parts to permit identification thereof. These numbers are parts numbers I. In the case that a hundred pieces of parts (M=100) are delivered when a parts number was 1000 before the delivery, the parts numbers I for the newly delivered parts are now 1001 to 1100. The delivery amount M is the product of the amount of the delivery lot (for instance 20 parts/lot) and the amount of units or lots (for instance 5 lots). Hereinafter, by the term "lot amount" is meant the amount of units or lots of parts. This amount is not always equal to M.

When the delivered parts are used up so that the parts accommodation vessel becomes empty, the label is read out by the label reader to obtain parts used data. The label that has been read, is recovered in a label recovery cycle. The label reader constitutes a parts used data reader 7-3 (or 6-5 in FIG. 6). FIG. 9 shows parts used data that is read out. The data relates together the kind i of the used parts, the preceding process j that have delivered the parts, the amount X1 of the used parts, the parts numbers I of the used parts and the time t when the parts were used.

The parts delivery data (FIG. 8) read out in the parts delivery data reader 7-1 is stored in a parts delivery data storage area 7-2. The parts used data (FIG. 9) read out in the parts used data reader 7-3 is stored in a parts used data storage area 7-4. The parts delivery and used data storage areas 7-2 and 7-4 are provided in a data storage area in the memory 6-2 shown in FIG. 6.

A stock time calculator 7-9 is started whenever parts used data (FIG. 9) is inputted. The stock time calculator 7-9 is constituted by the central processing unit 6-1 and a program for process execution of the unit 6-1. The stock time calculator 7-9, as shown in a reference view of FIG. 10, retrieves parts used data of parts used in a predetermined past period $\Delta t1$ of time. Then, it retrieves parts delivery data with the retrieved parts numbers I to determine the parts delivery time instant. From the retrieved parts delivery and used time instants, the stock time ZI (I=I, I−1, I−2 ..., I−I1) is calculated. The calculated stock time is averaged, and the averaged stock time Z is used as the current stock time. The stock time Z is calculated for every kind i of parts and also for every preceding process j, and it is updated whenever parts are used.

The operator's console 7-14 (which is shown at 6-7 in FIG. 6) is used by the operator for inputting production and logistics condition data. FIG. 11 shows production condition data. As shown, the data relates together the amount (lot amount Li) of each kind i of parts required to be used to produce a product, plant "off" days T*, etc. Whenever such data are changed, new data are inputted from the operator's console 7-14. FIG. 12 shows logistics condition data. The data relates together the parts storage section k (K=1 to K), the kind i (i=1 to I) of parts stored, the preceding process j (j=1 to J), the amount S of parts that can be stored, and the time T required from the ordering till the delivery of parts i. The time required from the ordering till the delivery is proportional to (a/b) x c. As noted before, a-b-c represents values concerning the cycle of label delivery of b times in a days with a delay of c deliverers. Again the logistics condition data is inputted from the operator's console 7-14 afresh whenever it is changed.

The production and logistics condition data that are inputted from the operator's console 7-14, are stored in a production and a logistics condition storage area 7-12 and 7-13, respectively. These storage areas 7-12 and 7-13 are prepared in the memory 6-2 shown in FIG. 6 and constitute a production and a logistics condition file 5-10 and 5-11, respectively.

In the memory 6-2 is further prepared a weight file (shown at 5-9 in FIG. 5 and at 7-10 in FIG. 7(B)) for storing weight data. The contents in the weight file 7-10 will now be described.

In the weight file 7-10, five different weight coefficients f1j to f5j that are necessary for final weight determination are stored in the form of a map. The weight coefficients f1j to f5j are related to the adaptability of the subsequently resupplying system. The maximum value of "1" is given when the subsequently resupplying system is 100% adaptable, while the minimum value of "0" is given when the use plan correspondence system is 100% adaptable.

Figure 14:
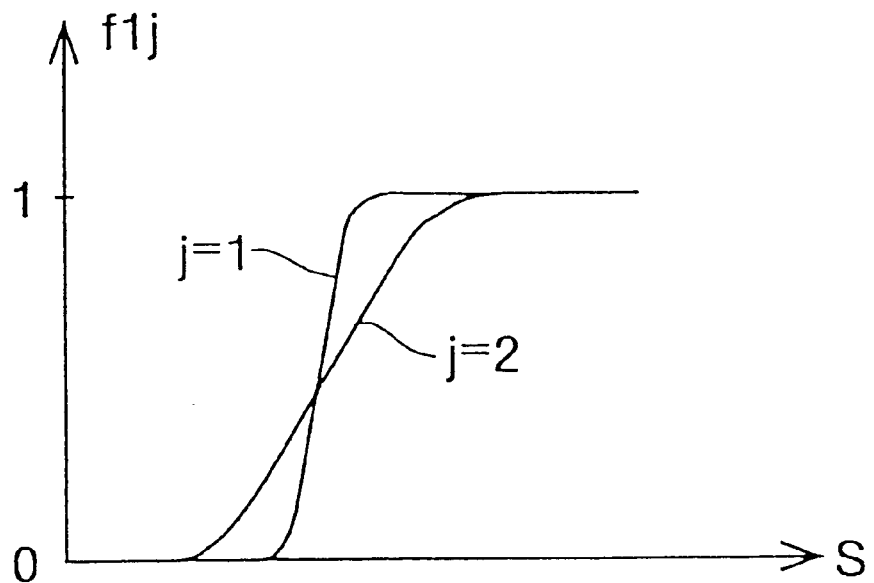
FIG. 14 is a graph showing the relation between first coefficient and stock capacity.

FIG. 14 shows a first weight coefficient f1j stored in the weight file 7-10. As shown, the first weight factor f1j is stored as a variable value with respect to the amount S of parts that can be stored in the parts storage section k.

As shown in FIG. 14, the first weight coefficient f1j is "1" if the amount S of parts that can be stored is sufficiently large so that no problem is posed by ordering parts in the subsequently resupplying system. If the amount S of parts that can be stored is not redundant so that a problem will be posed by ordering parts in the subsequently resupplying system, on the other hand, the coefficient f1j is set to a value close to "0". Further, the coefficient f1j has different values for different preceding processes. For example, plot labeled j=1 represents a case of a preceding process which is a large scale manufacturer of parts. In this case, the subsequently resupplying system can be adopted without any trouble even when the amount S of parts capable of being stored is comparatively small. Plot labeled j=2, on the other hand, represents a case of a preceding process which is a poorly redundant manufacturer of parts. In this case, the amount S of parts capable of being stored is not sufficiently redundant, and it is therefore difficult to adopt the subsequently resupplying system.

Figure 15:
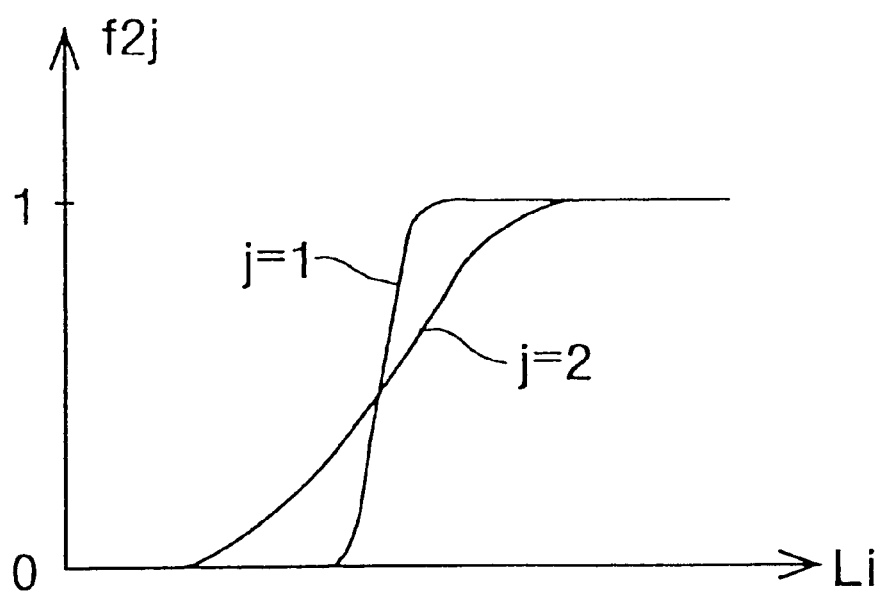
FIG. 15 is a graph showing the relation between second coefficient and use lot amount.

FIG. 15 shows the second weight coefficient f2j that is stored in the weight file 7-10. This coefficient f2j reflects the adaptability of the subsequently resupplying system dependent on the use lot amount Li (see FIG. 11). The greater the use lot amount Li, the more the subsequently resupplying system is preferred because of the more significant problem in case of the failure of observation of the plan. In this case, the second weight coefficient f2j thus becomes closer to "1". If the use lot amount Li is small, on the other hand, the coefficient f2j is close to "0" because in this case the problem that may be posed by placing order in conformity to the plan is less significant. Further, again this coefficient is influenced by the characteristics of the preceding process.

Figure 16:
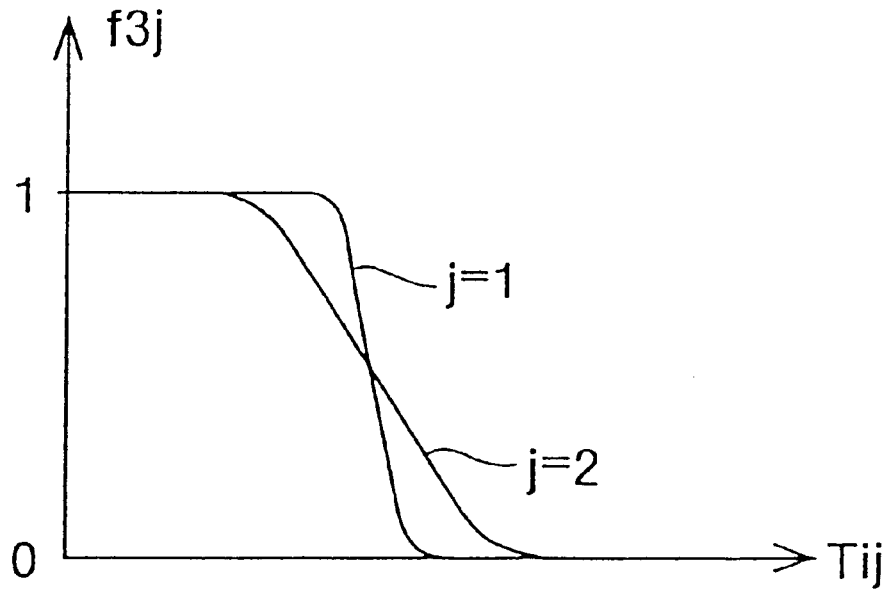
FIG. 16 is a graph showing the relation between third coefficient and time required from ordering till delivery.

FIG. 16 shows the third weight coefficient f3j. This coefficient reflects the adaptability of the subsequently resupplying system dependent on the time T required from the ordering till the delivery (see FIG. 12). If the time T is long, the problem in case of the subsequently resupplying system becomes significant. In this case, the coefficient becomes close to "0". If the time T is short, on the other hand, the coefficient is close to "1" because the problem in case of adopting the subsequently resupplying system is less significant. Again this coefficient is varied with the characteristics of the preceding process.

Figure 17:
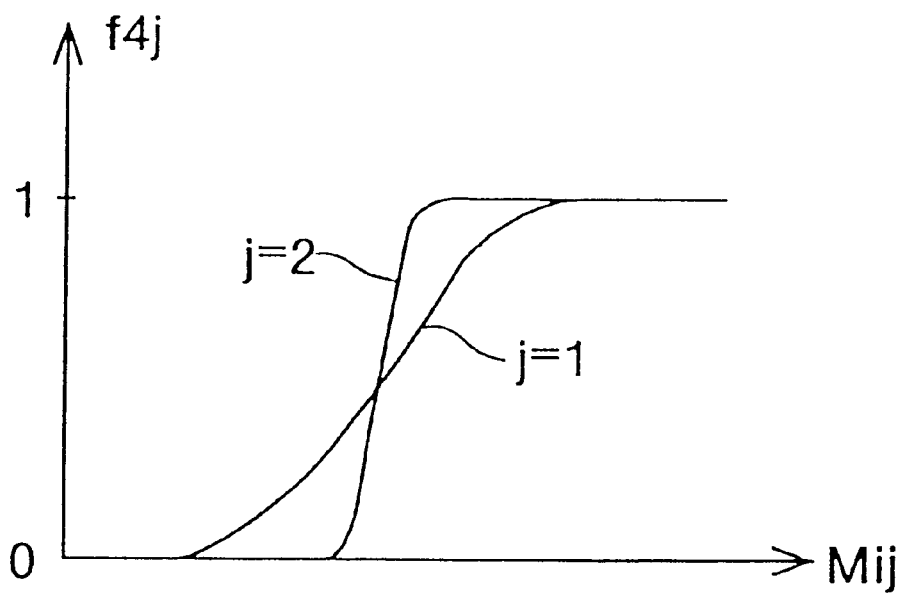
FIG. 17 is a graph showing the relation between fourth coefficient and delivery amount.

FIG. 17 shows the fourth weight coefficient f4j. This coefficient reflects the adaptability of the subsequently resupplying system dependent on the delivery amount M1j of parts delivered in each cycle (see FIG. 8). The relation here is similar to that in the case of FIG. 15. That is, the greater the delivery amount, the more it is inevitable to adopt the subsequently resupplying system. In this case, the coefficient becomes closer to "1". Again the preceding process characteristics are reflected on this coefficient.

Figure 18:
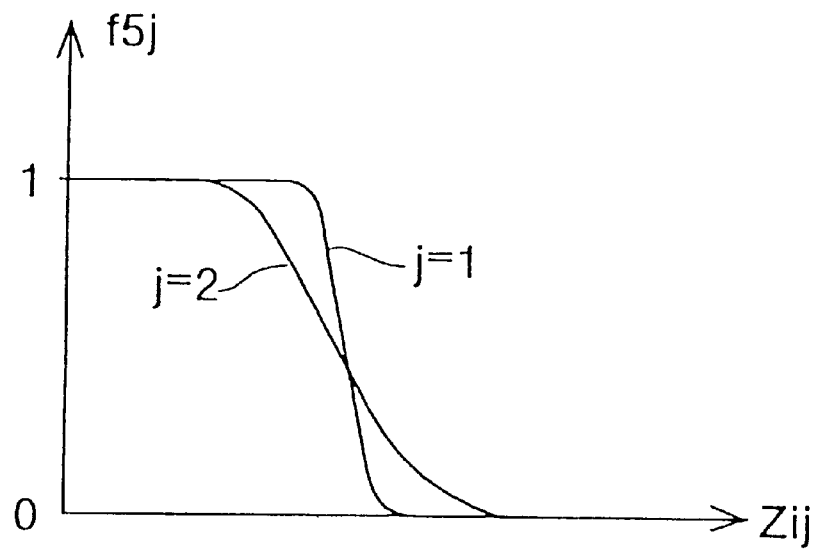
FIG. 18 is a graph showing the relation between fifth coefficient and stock time.

FIG. 18 shows the fifth weight coefficient f5j, which is dependent on the stock time (i.e., time as shown in FIG. 10, calculated by a calculator 7-9). This coefficient reflects the relation that the longer the stock time, the more the problem in adopting the subsequently resupplying system is significant and the more the plan correspondence system is preferred. Again the preceding process characteristics are reflected on this coefficient.

A weight determining unit 7-11 shown in FIG. 7(B) executes the following process. The unit 7-11 is constituted by the central processing unit 6-1 and a program for controlling the processing of the unit 6-1. The unit 6-1 is started whenever a change arises in either of the amount S of parts that can be stored, the use lot amount Li, the time Tij from the ordering till the delivery, the amount Mij of delivery in each cycle and the stock time Zij.

When the weight determining unit 7-11 is started:

(1) it retrieves the amount S of parts capable of being stored, stored in the logistics condition data storage area 7-13, and also reads out the first weight coefficient f1j corresponding to the retrieved amount S from the first weight coefficient map (f1j, see FIG. 14) which is stored in the weight file 7-10;

(2) further, it retrieves the use lot amount Lij stored in the production condition data storage area 7-12, and also reads out the second weight coefficient f2j corresponding to the retrieved amount Lij from the second weight coefficient map (f2j, see FIG. 15) stored in the weight file 7-10;

(3) further, it retrieves the time Tij required from the ordering till the delivery, stored in the logistics condition data storage area 7-13, and also reads out the third weight coefficient f3j from the third weight coefficient map (f3j, see FIG. 16) stored in the weight file 7-10;

(4) further, it retrieves the amount Mij of delivery in each cycle, stored in the parts delivery data storage area 7-2, and also reads out the fourth weight coefficient f4j corresponding to the retrieved amount M from the fourth weight coefficient map (f4j, see FIG. 17) stored in the weight file 7-10;

(5) further, it reads out the fifth weight coefficient f5j from the fifth weight coefficient map (f5j, see FIG. 18) corresponding to the stock time calculated in the stock time calculator 7-9;

(6) then, it obtains the average of the first to fifth weight coefficients having been read out, that is, obtains the average weight coefficient f as $$f=(f1j+f2j+f3j+f4j+f5j)/5$$

and determines this average weight coefficient as the actual weight W1; and (7) then, it determines the plan weight W2 as

W2=1−W1.

The actual and plan weights W1 and W2 that are determined in this way correctly reflect the adaptabilities of the subsequently resupplying and plan correspondence systems to the actual circumstance which is represented by the amount S of parts that can be stored, the use lot amount L, the time T from the ordering till the delivery, the amount M of delivery in each cycle and the stock time Z.

In this embodiment, a volume factor of the actual circumstance is represented by the amount S of parts capable of being stored, a time factor of the actual circumstance is represented by the stock time Z and the time T from the ordering till the delivery, and the amount of change of the actual circumstance is represented by the use lot amount L and the delivery amount M. These values are used to characterize the actual circumstance, and the actual and plan weights which are best suited to the actual circumstance represented by these characteristics are determined.

While the description so far concerns this embodiment, depending on circumstances, either one of the factors of the volume, time and change amount may be used for the circumstance characterization. In this case, it is possible to determine the weight from a single parameter.

Further, it is only an example that the amount S of parts capable of being stored represents the volume, and it is possible that the absolute volume of the storage space represents the volume. Further, for the time representation, various modifications are possible, such as the use of the delivery or use amount per unit time. Further, the change amount may be represented by using the delivery lot amount or use amount per unit time.

As shown in FIGS. 7(A) and 7(B), the ordering data calculator 7-15 is on- or off-line connected to a host computer 7-5. The host computer 7-5 produces production plan data for the subsequent process by forecasting future demand data for the subsequent process by forecasting future demand changes. This data is inputted to a parts use planner 7-6 to produce a self-process parts use plan data that is necessary to support a subsequent process production plan. FIG. 13 shows the parts use plan data that is produced. As shown, the data relates together the kind i of parts, the preceding process j, the time instant t of use of parts and the amount X2 of the parts to be used. This data is inputted from an input unit 7-7 to be stored in a parts use plan data storage area 7-8. The storage area 7-8 is prepared in a data storage area of the memory 6-2. The input unit 7-7 is constituted by a floppy disk drive, but it may be on-line connected to the parts use planner 7-6 as well.

The ordering data calculator 5-12 includes an order amount calculator 7-15 as shown in FIG. 7(8). The order amount calculator 7-15 is constituted by the central processing unit 6-1 and a program for process execution. The calculator 7-15 receives data of the actual and plan weights W1 and W2 determined by the weight determining unit 7-11, the used amount X1 data stored in the parts used data storage area 7-4 and the use plan amount X2 data stored in the parts use plan data storage area 7-8 and calculates the order amount as ((W1·X1+W2·X2).

Figure 19:
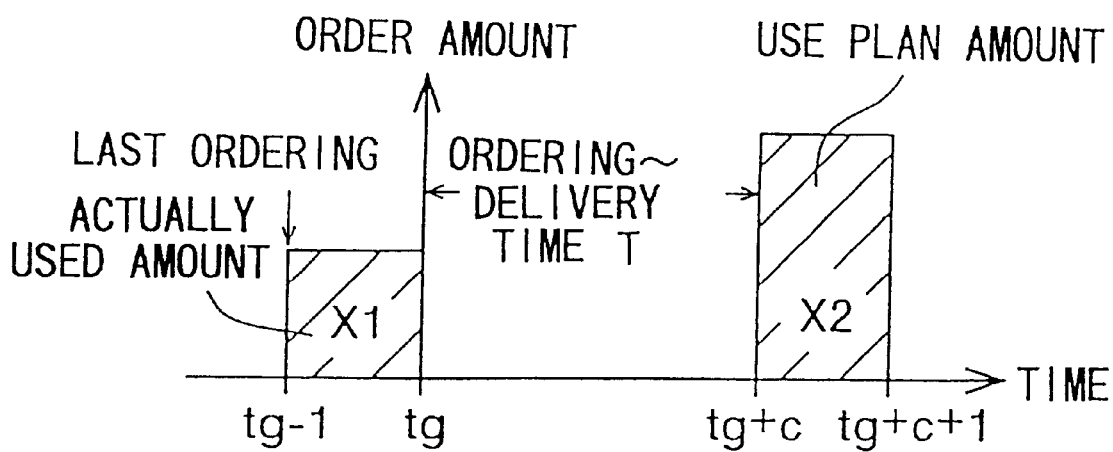
FIG. 19 is a schematic view showing a process of determining order amount from actually used amount and use plan amount.

FIG. 19 illustrates how the ordering is effected. Designated at tg is a timing of ordering. From the parts amount X1 of parts that were used in the self-process 1-3 after the instant tg−1 of the last ordering to the preceding process 1-1. Meanwhile, from the parts use plan data storage area 7-8 is read out data of the use plan amount X2 of parts that are planned to be used between a future instant (timing tg+c) after the time T required from the ordering till the delivery and the subsequent delivery (timing tg+c+1). Here, the use plan amount X2 is of parts that are planned to be used for a period of time from the timing tg+c till the next parts delivery timing tg+c+1.

When the order amount is equal to the actually used amount X1, the used parts are resupplied subsequently, and the stock amount is made up. When the order amount is equal to the use plan amount X2, the parts necessary to meet the plan is delivered.

In this embodiment, the order amount is calculated as (W1·X1+W2·X2). As noted before, W1 is as large as nearly "1" in a circumstance in which the subsequently resupplying system is preferred. In this case, W2 is as small as nearly "0". In this case, importance is attached to W1 (actual weight) in determining the order amount. On the other hand, in the circumstances in which the plan correspondence system is preferred to the subsequently resupplying system, W2 is as large as nearly "1". In this case, importance is attached to W2 (plan weight) in the order amount determination.

The determined order amount is stored in an ordering data storage area 7-16, and also this data is transmitted through an ordering data output unit 7-17 via a communication line 7-18.

In this embodiment, the order amount calculator 7-15 reads out the used amount X1 as shown in FIG. 19 from the parts used data storage area 7-4 for the execution of detecting the amount of parts actually used in the self-process 1-3 after the instant (timing tg−1) of the last ordering to the preceding process 1-1. In addition, the order amount calculator 7-15 reads out the use plan amount X2 as shown in FIG. 19 from the parts use plan data storage area 7-8 for the execution of the step of calculating the use plan amount of parts at a future instant after the time required from the ordering till the delivery. The order amount calculator 7-15 calculates the order amount of parts to the preceding process 1-1 from the used amount X1 that has been detected and the use plan amount X2 that has been calculated.

Particularly, the order amount calculator 7-15 determines the order amount as ((W1·X1+W2·X2), with the sum of the actual and plan weights W1 and W2 set to "1". The actual weight W1 is determined from at least one of the values of the stock capacity S, the stock time Z, the delivery and use lot amounts, etc., as is obvious from the above description of the processing of the weight determining unit 7-11.

In this embodiment, in a demand variation period in which the preceding and present used amounts are different, the plan weight W2 approaches "1" while the actual weight W1 approaches "0". Thus, the order amount is close to the plan amount, so that it is possible to prevent the occurrence of excessive stock or lack of parts. In a stable demand period, on the other hand, the actual weight W1 approaches "1" while the plan weight W2 approaches "0", and thus the order amount is close to the actually used amount. It is thus possible to prevent excessive stock or lack of parts from taking place even in case when a wrong plan is produced or when the produced plan fails to be observed due to a facility trouble or like cause.

In general, in this embodiment under various conditions, the order amount is made to be an adequate value for continuing the cycle of ordering, delivery and use of parts with less troubles and less waste.

Second Embodiment

In the above first embodiment, the actual and plan weights W1 and W2 were determined by using the weight coefficients shown in FIGS. 14 to 18. This requires determination of the weight coefficients shown in FIGS. 14 to 18 in advance. In the second embodiment which will now be described, the actual and plan weights W1 and W2 are determined by analyzing past phenomena. In this embodiment, the hardware structure is the same as in the first embodiment, so that the previous description in connection with FIG. 6 also applies to the description of this embodiment.

Figure 20A:
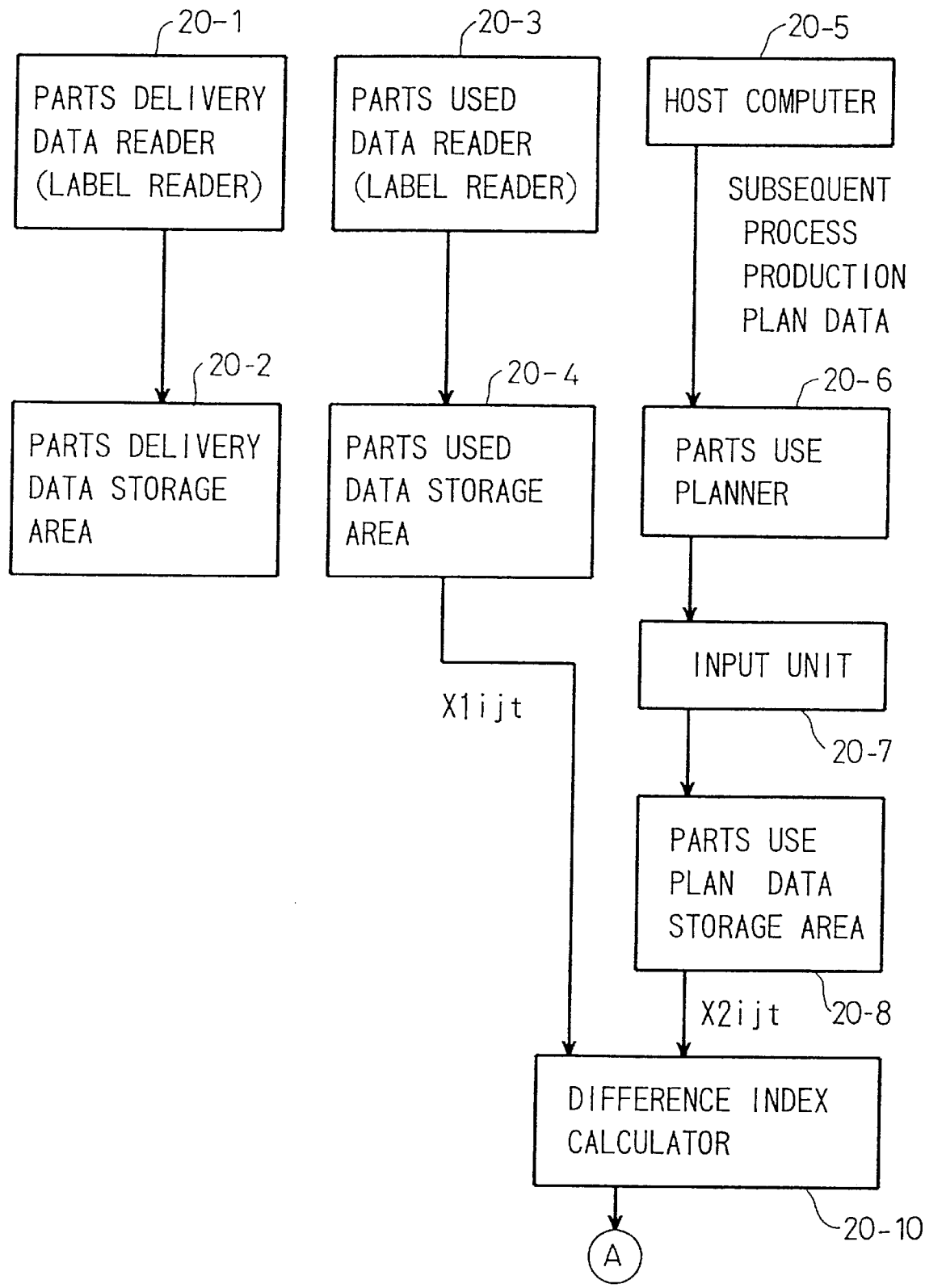
FIGS. 20(A) to 20(C) are a block diagram showing the construction and functions of a second embodiment of the system.
Figure 20B:
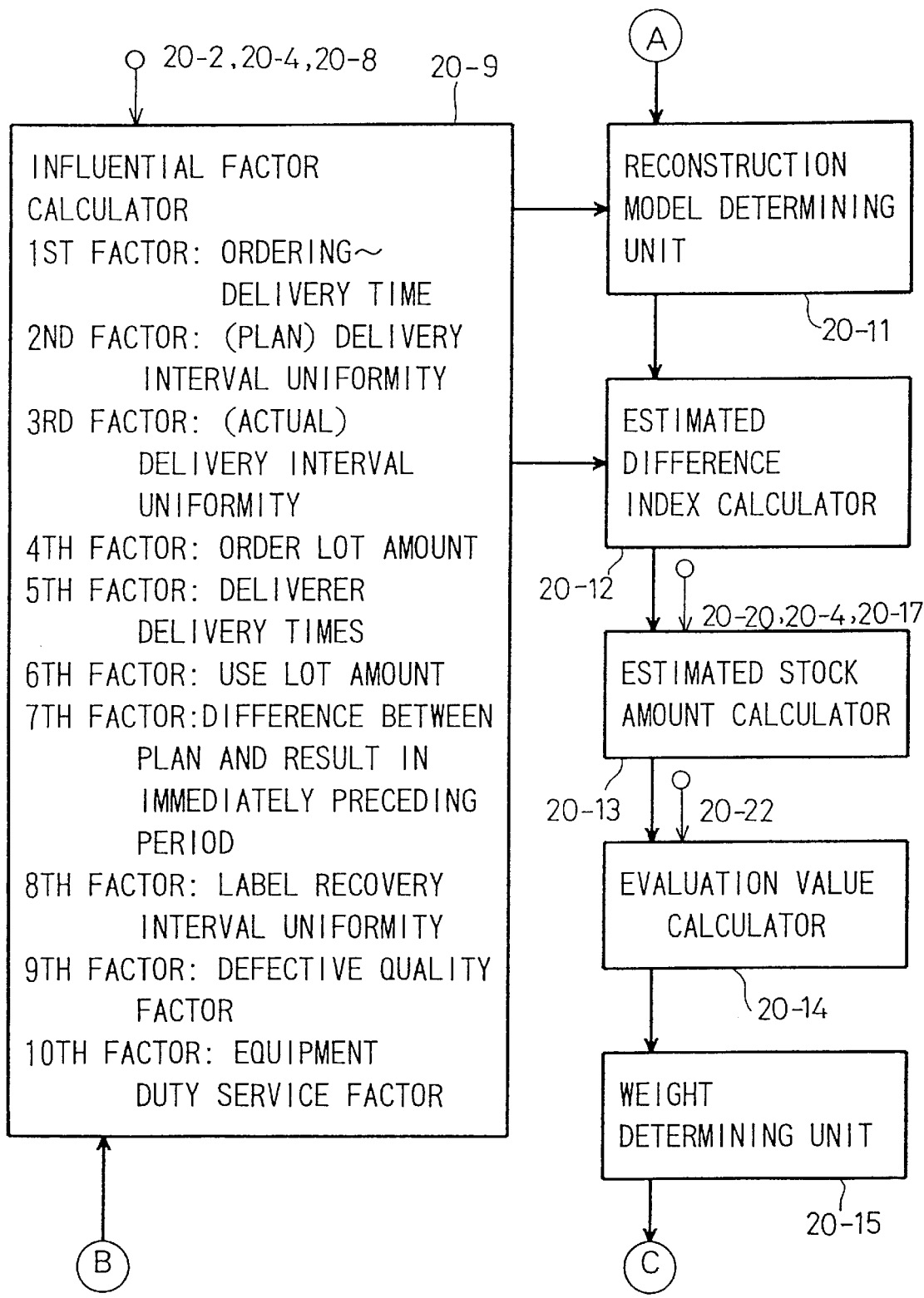
Figure 20:
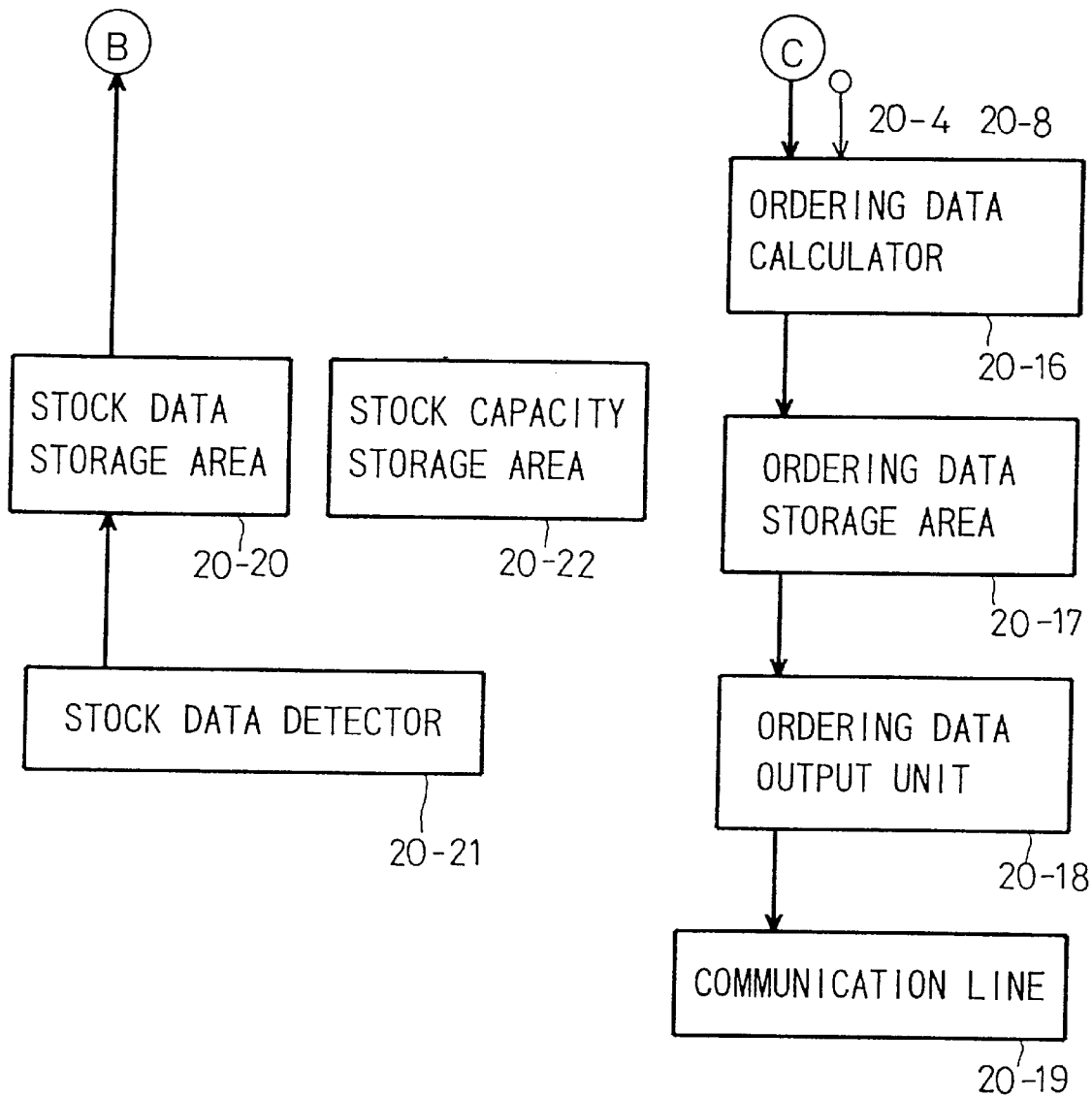

FIGS. 20(A) to 20(C) are a view corresponding to FIGS. 7(A) and 7(B) but concerning the second embodiment. In FIGS. 20(A) to 20(C), parts delivery data reader 20-1, parts delivery data storage area 20-2, parts used data reader 20-3, parts used data storage area 20-4, host computer 20-5, parts use planner 20-6, input unit 20-7 and parts use plan data storage area 20-8 are like those described before in connection with FIGS. 7(A) and 7(B) in the construction, function and role, so that the previous description is applied.

What are peculiar to the second embodiment will now be described. Parts 20-9 to 20-16 are constituted by the central processing unit 6-1 shown in FIG. 6 and programs for controlling the processing in the unit 6-1.

Figure 21:
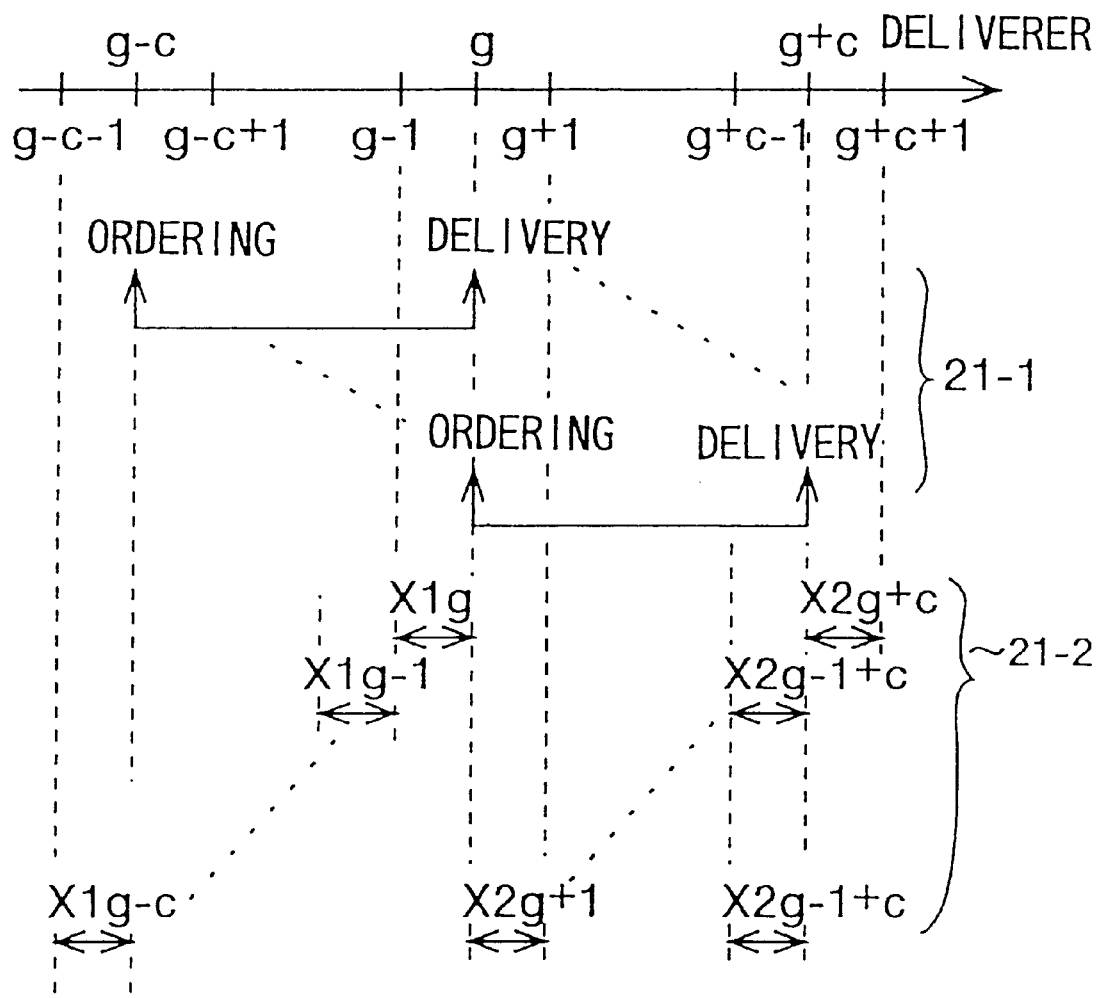
FIG. 21 is a schematic view showing difference index contents.

This embodiment comprises a difference index calculator 20-10 which calculates a difference index V indicative of the extent of difference between the parts used amount X1 detected in the parts used amount detection step and the use plan amount X2 at a future instant after the time T required from the ordering till the delivery with respect to the instant of the detection. FIG. 21 shows the contents of the difference index.

In FIG. 21, the abscissa is taken for the parts delivery timing. It is assumed that the present time corresponds to the g-th parts delivery timing. The difference index indicates the extent of difference between the current order amount and the use plan amount when the ordered parts are delivered, and it is calculated using formula (1) in FIG. 21. As shown at 21-1, an effective order amount at the g-th parts delivery timing is the total of what was ordered at the (g−c)-th parts delivery timing till what is ordered at the g-th parts delivery timing. What is ordered at the g-th parts delivery timing is delivered at the (g+c)-th parts delivery timing.

Substituting m=1 into the formula (1), the resultant formula is for obtaining the square of the difference between the actually used amount of parts for the period of the (g−1)-th to the g-th timings and the use plan amount of parts for the period of the (g+c)-th to the (g+c+1)-th timings. Every time m is incremented by "1", the time periods of the actually used amount and use plan amount are retroactively shifted.

Using suffix g to the actually used amount X1 and use plan amount X2 at the g-th to the (g−1)-th timings, the difference index V is expressed as formula (2) in FIG. 21. The meaning of this formula (2) is shown at 21-2. As is seen from the showing 21-2, while an amount X1g is to be delivered at the (g+c)-th timing in response to the ordering of the amount X1g at the g-th timing, the use plan amount at the (g+c)-th timing is X2g+c. To determine the extent of the difference between the two amounts, the square of the difference is calculated. The same operation is performed in the ordering cycles at the (g−1)-th, (g−2)-th, ... and (g−c)-th timings. In this way, the square of the difference between the amount of parts effectively ordered at the g-th timing and the amount of parts to be used is calculated. The difference index V is the total of these squares. The difference index V is obtained for each kind i of parts and also for each preceding process j, and it is calculated for each parts delivery timing.

Designated at 20-9 in FIG. 20(B) is an influential factor calculator which calculates the values of influential factors that must have influence on the difference index V. In this embodiment, ten influential factors are adopted.

A first influential factor X1 is representative of the time required from the ordering till the delivery. Where the delivery is made b times in a days with a delay of c deliverers, the factor x1 is calculated as (a/b)·c. This value is equal to the average value of the time labeled T in FIG. 12. The factor x1 is obtained for each kind i of parts and also for each preceding process j.

A second influential factor x2 is representative of the uniformity of the parts delivery intervals (plan). Where it is planned to deliver parts at intervals P1, P2, ... as shown in FIG. 22, the second influential factor x2 is the sum of the squares each of the difference between each interval Pm (m=1 to b) and the average interval (P1+P2+ ... +Pb)/b (see formula (3) in FIG. 22). If all the parts delivery intervals are equal, the factor x2 is zero. The greater the departure from the uniformity, the factor x2 has the greater value.

A third influential factor x3 is also representative of the parts delivery interval uniformity. This factor x3, however, is based on the actual delivery intervals Q instead of the plan delivery intervals P.

A fourth influential factor x4 is representative of the order lot amount per label. FIG. 22 shows a manner of delivery of parts on the basis of two labels, with an amount x4 delivered per label. The delivery amount M shown in FIG. 8 is the product of the order lot amount x4 and the label amount.

A fifth influential factor x5 is representative of the amount M, i.e., the delivery amount by each deliverer.

A sixth influential factor x6 is representative of the parts amount (use lot amount) for producing one product. This amount is the same as the use lot amount L shown in FIG. 11.

A seventh influential factor x7 is representative of the extent of difference between the use plan amount X2 at the immediately preceding timing and the actually used amount X1. Where calculation is made with respect to the g-th parts delivery timing as shown in FIG. 22, the factor x7 is obtained as the square of the difference between the amount X2 of parts, which are planned to be used from the immediately preceding parts delivery timing (i.e., (g−1)-th timing) till the present timing (i.e., g-th timing), and the amount X1 of parts that have been actually used up to that time.

An eighth influential factor x8 is an index concerning the label recovery interval uniformity. As described above, when parts are used up, the label is recovered to be ready for the next order. This factor x8 is zero where labels are recovered at a uniform interval. The greater the deviation from the uniformity, the greater is its value. E in formula (6) in FIG. 22 represents the label recovery interval.

A ninth influential factor x9 is representative of the defectiveness factor of delivered parts. The influential factors so far are each obtained for each kind i of parts and also for each preceding process j.

The last or tenth influential factor is representative of the equipment duty service factor of the self-process.

Figure 23:
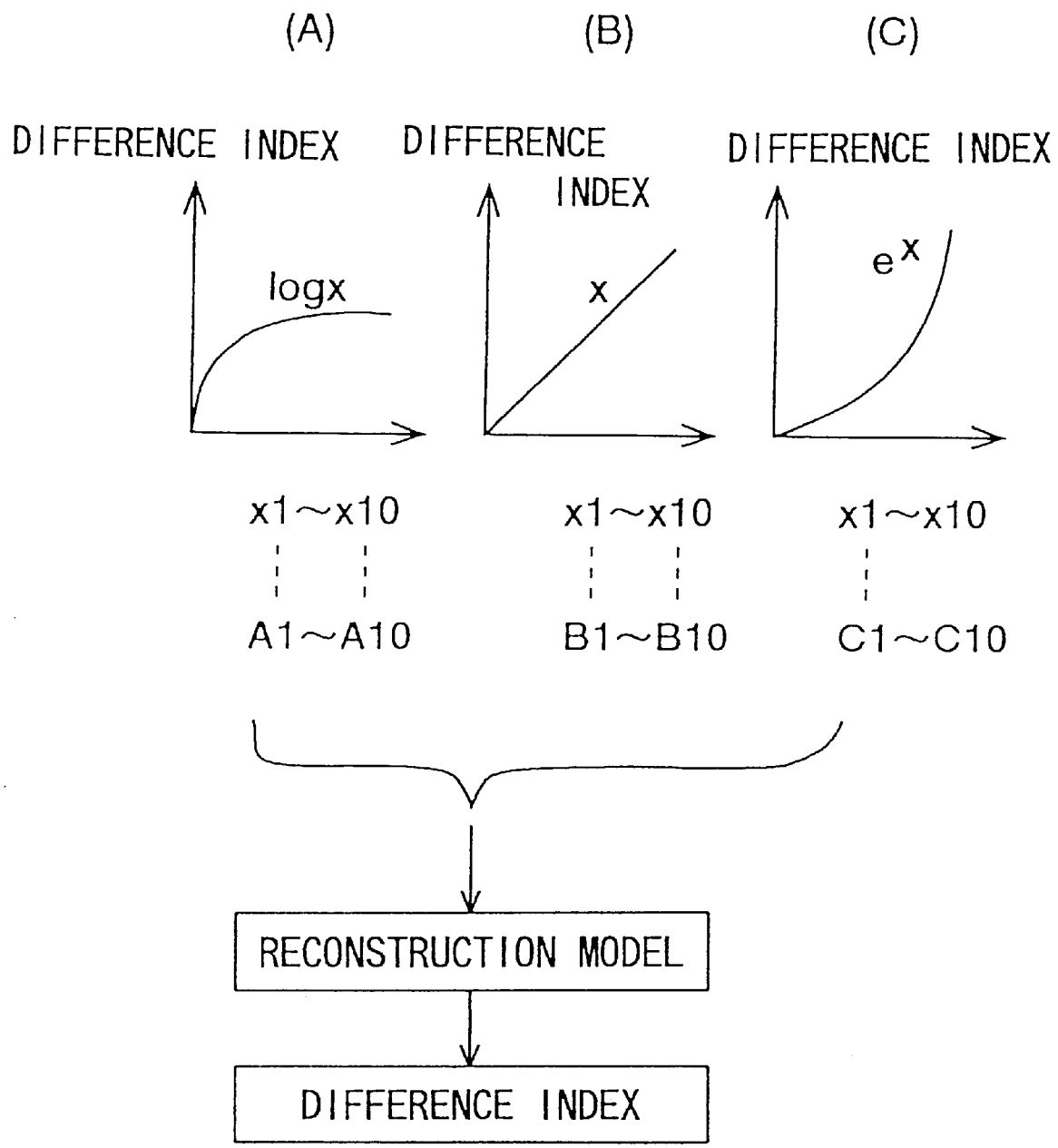
FIG. 23 is a schematic view showing a reconstruction model determination step.

The difference factor Vij must be closely related to the influential factors. For example, it is estimated to be increased with increasing time (first influential factor) required from the ordering till the delivery. Generally, the difference index V is estimated to be related to each influential factor x with one of patterns A to C as shown in FIG. 23.

That is, it is thought that $$V = A1 \cdot \log x1 + A2 \cdot \log x2 + \ldots + A10 \cdot \log x10 + B1 \cdot x1 + B2 \cdot x2 \ldots + B10 \cdot x10 + C1 \cdot e^{x1} + C2 \cdot e^{x2} + \ldots + C10 \cdot e^{x10},$$

where A1 to A10, B1 to B10 and C1 to C10 are factors indicative of the importance of having each pattern.

A reconstruction model determining unit 20-11 shown in FIG. 20(B) determines a reconstruction model by determining the factors A1 to A10, B1 to B10 and C1 to C10. To this end, difference indexes are calculated according to past information that has been collected, and also influential factors at that time is calculated. The above factors are determined through multiple variable analysis that is carried out according to many past difference indexes and influential factors which are different in the timing, kind i of parts and preceding process j. As a result, it is clarified what influence was given to the difference indexes by what influential factors.

An estimated difference index calculator 20-12 calculates the estimated value of difference index which may be in force c delivers afterwards, from the factors A1 to A10, B1 to B10 and C1 to C10 determined by the reconstruction model determining unit 20-11 and the present values of the influential factors X1 to x10. This calculation is done by utilizing past trend analysis results, and it is expected that correct estimation is obtainable.

Figure 24:
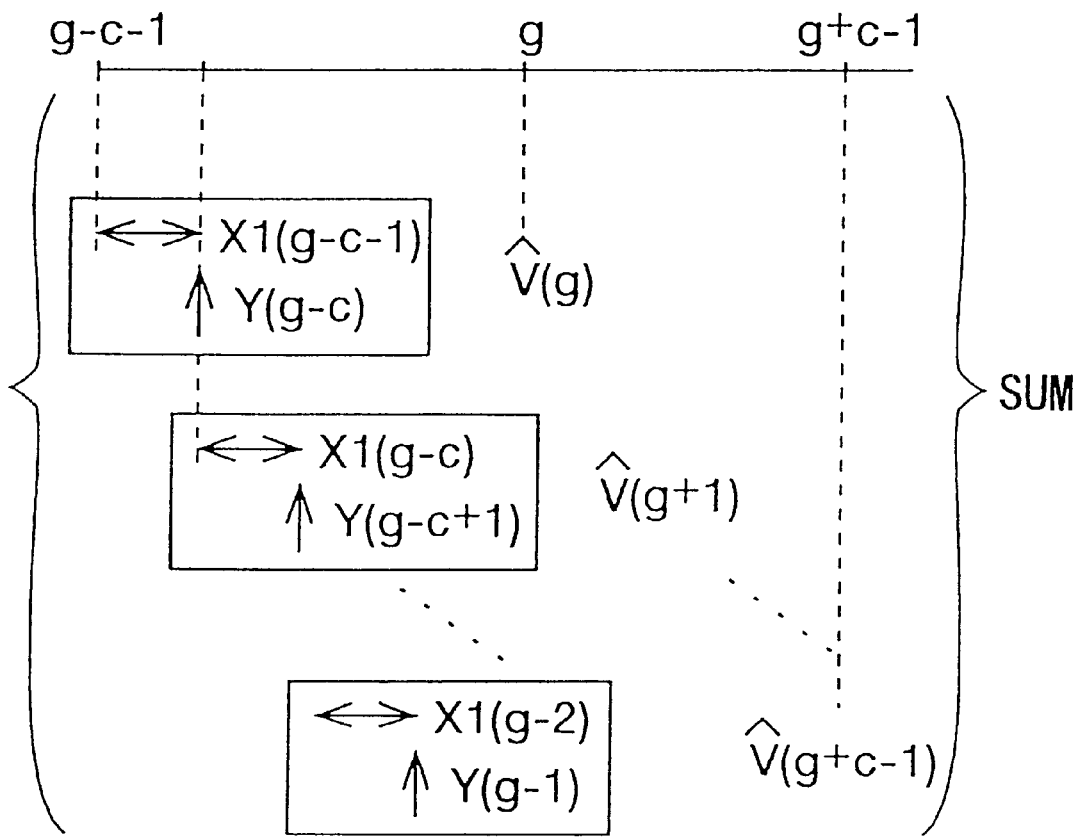
FIG. 24 is a schematic view showing a step of obtaining estimated stock amount.

When the estimated difference index has been calculated in the estimated difference index calculator 20-12, the estimated stock amount that will be in force c delivers afterwards is calculated (estimated stock amount calculator 20-13). The stock amount is estimated in a manner as shown in FIG. 24. Exemplified in FIG. 24 is a case where the stock amount that will be in force at the (g+c)-th parts delivery timing is estimated at the g-th timing. In the formula shown in the lower half of FIG. 24, I(g) represents the actual stock amount at the g-th parts delivery timing, and it is directly detected. As shown in FIG. 20(C), a stock data detector 20-21 is provided, and detected stock data therefrom is stored in a stock data storage area 20-20. This data is dealt with as the actual stock amount shown as I(g) in FIG. 24.

Shown as X1(g−c−1) in FIG. 24 is the amount of parts actually used from the (g−c−1)-th parts delivery timing till the (g−c)-th timing. This data is stored in the parts used data storage area 20-4. Shown at Y(g−c) is the amount of parts actually ordered at the (g−c)-th parts delivery timing. This data is stored in the ordering data storage area 20-17.

If the ordered amount Y corresponds to the used amount X1, there must be no stock amount variation. If the former amount is greater than the latter, the stock amount is increased. The amount variation is accumulated for each parts delivery timing. The second and third terms of the formula shown in FIG. 24 correspond to the accumulation.

The amount of parts ordered at the (g−c)-th timing is delivered at the g-th timing. The amount of parts used from the g-th to the (g+1)-th timing is not always equal to X1 (g−c−1). This difference is calculated as the difference index, and by taking this difference index into considerations, a substantially correct estimated stock amount must be calculated. The last term in the formula in FIG. 24 corresponds to this element. Here, the difference index V is provided with root. This is so because the difference index V is the sum of difference squares as described before in connection with FIG. 21. Further, the time differential of the difference index is taken in that the difference index concerns the difference at the c-th parts delivery timing, that is, in order to convert the difference index into the delivery amount at each timing. In the above way, the estimated stock amount at the (g+c)-th timing is calculated.

When the estimated stock amount I(g+c) has been calculated in the estimated stock amount calculator 20-13, an evaluation value H is calculated after a formula $$Hij=IPij-Iij(g+c)$$

Figures 25, 26:
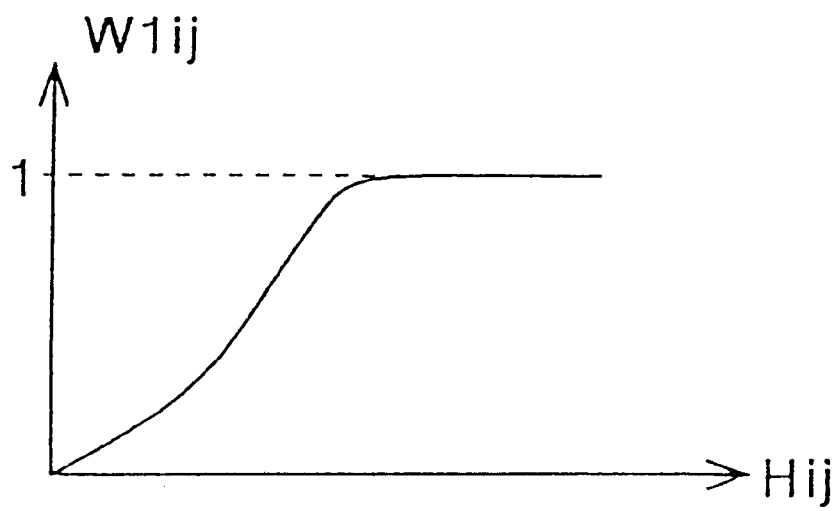
FIG. 25 is a schematic view showing a step of obtaining evaluation value.
FIG. 26 is a schematic view showing a step of obtaining weight from the evaluation value.

(see FIG. 25). IPij is the stock capacity (amount of parts capable of being stored), and it is stored in a stock capacity storage area 20-22 as shown in FIG. 20(C). Iij(g+c) is the estimated stock amount calculated in the calculator 20-13 noted above. IPij and Iij(g+c) are obtained for each kind i of parts and also for each preceding process j.

The evaluation value well corresponds to the adaptability of the subsequently resupplying system that is obtained as a result of analysis of past data. The more redundant the stock capacity is, i.e., the greater the evaluation value H is, the adaptability of the subsequently resupplying system is the higher. On the other hand, the less the stock capacity redundancy, the subsequently resupplying system adaptability is the lower. This relation is utilized for determining the actual weight Wij.

More specifically, the actual weight W1ij is obtained in correspondence to the evaluation value Hij by utilizing the relation as shown in FIG. 26, and it is calculated after formula (26) in FIG. 26. In the formula (26), $\sigma$ is the standard deviation of H, and $\mu$ is the average value of H. The calculation is carried out in the weight determining unit 20-15 as shown in FIG. 20(B). When the actual weight W1 has been determined in the manner as shown in FIG. 26, the plan weight W2 is determined as (1−W1).

Subsequent to the weight determination, a processing like that described before in connection with FIGS. 7(A), 7(B) and 19 is executed.

In the second embodiment thus described, the adaptabilities of the subsequently resupplying and plan correspondence systems are analyzed and determined from data collected in the past, and the corresponding order amount is determined.

Thus, the difference index calculator 20-10 calculates the difference index which represents the extent of difference between the detected actually used amount X1 of parts and the use plan amount X2 at a future instant after the time required from the ordering till the delivery with respect to the instant of detection as the starting instant (see FIG. 21).

Then, the approximate relationship (or reconstruction model) that holds between the difference index and each influential factor thereon is determined (see FIG. 23). The influential factors that are adopted are the time required from the ordering till the delivery (first influential factor), the parts delivery interval uniformity (plan delivery interval being second influential factor, and the actual delivery interval being third influential factor), the order lot amount (fourth influential factor), the delivery amount by each deliverer (fifth influential factor), the delivery and use lot amounts such as the use lot amount (sixth influential factor), the difference between the actual use and use plan amounts (seventh influential factor), the label recovery interval uniformity (eighth influential factor), etc. All these influential factors need not be used, but at least one of them may be used depending on the characteristics of the process.

The approximate relationship that holds between the difference index and each influential factor is analyzed by the multiple variable analysis technique and determined in the reconstruction model determining unit 20-11. As a result, it is analyzed how the influential factor or factors influenced on the generation of the difference between the actual use and use plan amounts. As a result of the analysis, the adaptabilities of the subsequently resupplying and plan correspondence systems to the analyzed circumstances are determined, and on the basis of these adaptabilities the actual and plan weights can be determined correctly by taking the analysis results into considerations.

Particularly, the calculator 20-12 calculates the estimated difference index from the approximate relationship determined in the unit 20-11 and the influential factor or factors at the present time, then the calculator 20-13 calculates the estimated stock amount from the stock amount I(g) detected at that time, the detected actually used amount X1, the past order amount Y and the estimated difference index, then the calculator 20-14 calculates the evaluation value H from the estimated stock amount and the stock capacity (amount of parts capable of being stored), and the unit 20-15 determines the actual and plan weights W1 and W2 from the evaluation value H. Thus, the analysis is made objectively, and for the adaptability evaluation the weights W1 and W2 are determined on the basis the stock redundancy which is thought to be most adequate. An order amount is thus estimated, in which the process characteristics are taken into sufficient considerations.

In the second embodiment, the characteristics of each process are analyzed on the basis of past results for obtaining the best adaptabilities of the subsequently resupplying and plan correspondence systems, and the order amount is calculated according to these best adaptabilities. Thus, even in demand variation periods, smooth and waste-free cycle of ordering, delivery and use of parts can be maintained to maintain smooth production activities. The above-described method of analysis of the adaptabilities (or best dependencies) of the subsequently resupplying and plan correspondence systems, is by no means limitative, and it may be carried out in various other modes as well.

As has been described in detail in the foregoing, according to the invention the order amount is determined with the adaptabilities of the subsequently resupplying and plan correspondence systems into considerations, and thus it can be made adequate irrespective of whether the demand is varying or stable. A smooth and waste-free cycle of the ordering, delivery and use of parts thus can be maintained. Further, in one aspect of the invention, the best dependencies of the subsequently resupplying and plan correspondence systems are determined for each process from past results, and the order amount is determined by using these data. Thus, in the demand variation periods or stable demand periods, adequate order amount can be determined, which will not result in excessive or insufficient stock amount.

Thus, according to the invention, it is possible to minimize the stock space and so forth, and extreme effects are obtainable in the reduction of the space and cost.

While the invention has been described with reference to preferred embodiments thereof, it is to be understood that modifications or variations may be easily made without departing from the scope of the present invention which is defined by the appended claims.

What is claimed is:

1. A method of order amount calculation to calculate a variable order amount of parts to be delivered from a preceding process to a self-process producing a product which product is to be utilized in a subsequence process, comprising the steps of:

electronically detecting an amount of parts actually used in the self-process between a last time an amount of parts was ordered from the preceding process and a present ordering time;

calculating a use plan amount of parts expected to be required from the present ordering time until a next time that will be delivered from the preceding process, the use plan amount being generated from a production plan; and determining at the present ordering time the veriable order amount of parts to be delivered at the next time that parts will be delivered from the preceding process to the self-process, the variable order amount determination step being based on a combination of the actually used amount of parts detected in the actually used amount detection step and the use plan amount of parts calculated in the use plan amount calculation step.

2. The method of order amount calculation according to claim 1, wherein the variable order amount is determined in the variable order amount determination step as a sum (W1·X1+W2·X2), wherein (X1) represents the amount of part electronically detected in the actually used amount detection step and (W1) represents an actual weight, wherein (X2) represents the amount of parts calculated in the use plan amount calculation step and (W2) represents a plan weight, and wherein the actual weight (W1) and the plan weight (W2) are percentages and the sum (W1+W2) of the actual and plan weights (W1 and W2) is 1.

3. The method of order amount calculation according to claim 2, wherein the actual weight (W1) is determined on the basis of at least one of the values which is selected from the group consisting of stock capacity, stock time, delivery lot amount and use lot amounts.

4. The method of order amount calculation according to claim 2, further comprising the steps of:

calculating a difference index (V) indicative of a difference between the amount of actually used parts (X1) and the use plan amount (X2)and is calculated after the electronic detection of the amount of parts actually used (X1);

determining an approximate mathematical relationship between an influential factor and the difference index (V); and determining the actual weight (W1) according to the approximate mathematical relationship determined in the approximate relationship determination step.

5. The method of order amount calculation according to claim 4, wherein the influential factor is selected from the group consisting of a time required from the ordering until delivery, a parts delivery interval uniformity factor, delivery lot amounts, use lot amounts, an actual difference between the actual use and the use plan amounts and a label recovery interval uniformity factor.

6. The method of order amount calculation according to claim 4, further comprising the steps of:

calculating an estimated difference index from the approximate relationship determined in the approximate relationship determination step and the influential factor;

calculating an estimated stock amount from a currently detected stock amount, a detected actually used amount, a past order amount, and the estimated difference index (V) calculated in the estimated difference index calculation step;

calculating an evaluation value (H) from the estimated stock amount calculated in the estimated stock amount calculation step and the stock capacity; and determining the actual weight (W1) according to the evaluation value (H) calculated in the evaluation value calculation step.

7. An apparatus for order amount calculation to calculate a variable order amount of parts to be delivered from a preceding process to a self-process producing a product which product is to be utilized in a subsequent process, comprising:

means for electronically detecting an actually used amount (X1) of parts used in the self-process between a last time an amount of parts was ordered from the preceding process and a present ordering time;

means for calculating a use plan amount (X2) of parts expected to be required from the present ordering time until a next time that parts will be delivered from the preceding process, the use plan amount being generated from a production plan;

a memory for storing an actual weight (W1) and a plan weight (W2); and means for calculating at the present ordering time the variable order amount of parts to be delivered at the next time that parts will be delivered from the preceding process to the self-process, by adding the product (W1·X1) of the detected actually used amount (X1) and the actual weight (W1) and the product ((W2·X2) of the calculated use plan amount (X2) and the plan weight (W2);

wherein, the actual and plan weights (W1 and W2) are percentages, and the sum (W1+W2) of the actual and plan weights (W1 and W2) is 1.

8. The apparatus of claim 7, wherein the actual weight (W1) is determined on the basis of at least one factor that is selected from the group consisting of stock capacity, stock time, delivery lot amount and use lot amounts.

9. The apparatus of claim 7, further comprising:

means for calculating a different index (V) representative of a difference between the amount of actually used parts (X1) and the use plan amount (X2) and is calculated after the electronic detection of the amount of parts actually used (X1);

means for determining an approximate mathematical relationship between an influential factor and the difference index (V); and means for determining the actual weight (W1) according to the approximate mathematical relationship determined in the approximate relationship determination step.

10. The apparatus of claim 9, wherein the influential factor is selected from the group consisting of a time required from the ordering until delivery, a parts delivery interval uniformly factor, delivery lot amounts, use lot amounts, an actual difference between the actual use and the use plan amount and a label recovery interval uniformity factor.

11. The apparatus of claim 9, further comprising:

means for calculating an estimated difference index from the approximate relationship determined in the approximate relationship determination step and the influential factor;

means for calculating an estimated stock amount based upon the following factors: a current detected stock amount, a detected actually used amount, a past order amount, and the estimated difference index (V) calculated in the estimated difference index calculation sleep;

means for calculating an evaluation value (H) based upon the estimated stock amount and stock capacity; and means for determining the actual weight (W1) based upon the evaluation value (H).

12. A system for ordering parts for use in a manufacturing process, comprising:

storage for holding the parts;

means for electrically detecting an amount of parts removed from the storage during a first predetermined time period; and means for calculating a variable order amount of parts to be delivered to the storage based upon a first factor corresponding to the amount of parts that were removed from the storage during the first predetermined time period and a second factor corresponding to an amount of parts estimated to be removed from the storage in a second predetermined time period, the second predetermined time period being after the calculated amount of parts has been ordered.

13. The system of claim 12 further comprising means for delivering the ordered parts to the manufacturing process on a predetermined schedule.

14. The system of claim 12 wherein the means for determining the order amount of parts to be delivered to the storage includes:

means for multiplying the first factor by a first weight, thereby generating a first product, means for multiplying the second factor by a second weight, thereby generating a second product, and means for adding the first and second products to generate the order amount of parts to be delivered to the storage, wherein the sum of the first and second weights is 1.

15. The system of claim 14 wherein the first weight is determined based upon at least one weight coefficient selected from the group consisting of stock capacity, stock time, delivery lot amounts and use lot amounts.

16. The system of claim 15 wherein the first weight is determined based upon an average of at least two weight coefficients.

17. The system of claim 14 wherein the first weight is determined by calculating a difference between the first factor and the second factor, and determining an approximate relationship between an influential factor and the difference.

18. The system of claim 17 wherein the influential factor is selected from the group consisting of time required from parts ordering until delivery, a parts delivery interval uniformity factor, delivery lot amounts, use lot amounts, an actual difference between the actual use and the use plan amounts and a label recovery interval uniformity factor.

19. The system of claim 14 further comprising a memory for storing the first and second weights.

20. The system of claim 19 wherein the weights are predetermined.

21. The system of claim 19 wherein the weights are recalculated when a change in manufacturing conditions occurs.

22. The system of claim 12 wherein the second weight is calculated by subtracting the first weight from one.

23. The system of claim 12 wherein the first weight is calculated by subtracting the second weight from one.

24. A system for supplying parts to an automated manufacturing facility, comprising:

means for converting parts used information into a digital first factor, the parts used information embodying a quantity of parts removed from a storage during a first predetermined time period;

means for converting use plan information into a digital second factor, the use plan information embodying a quantity of parts expected to be removed from the storage during a second predetermined time period; and means for calculating a variable amount of parts to be delivered to the storage at the end of the second predetermined time period based upon the digital first factor and the digital second factor.

25. A system as in claim 24 further comprising:

means for ordering the amount of parts to be delivered to the storage, the order being generated at the end of the first predetermined time period.

26. A method for controlling production in an automated manufacturing plant, comprising:

inputting into a computer processor parts used data embodying a quantity of parts removed from a storage during a first predetermined time period and use plan data embodying a quantity of parts expected to be removed from the storage during a second predetermined time period;

using the computer processor to calculate an amount of parts ordered based upon the parts used data and the use plan data;

ordering the calculated amount of parts at the end of the first predetermined period.

27. A computer-readable medium embodying a program for controlling the manufacture of products, comprising:

instructions for calculating a variable amount of ordered parts data based upon parts used, data embodying a quantity of parts used during a first predetermined time period and use plan data embodying a quantity of parts expected to be used during a second predetermined time period; and instructions for generating the order of the calculated amount of parts at the end of the first predetermined time period.

* * * * *

UNITED STATES PATENT AND TRADEMARK OFFICE
CERTIFICATE OF CORRECTION

PATENT NO. : 5,930,763

DATED : 27 July 1999

INVENTOR(S) : Kuniya KANEKO et al.

It is certified that error appears in the above-identified patent and that said Letters Patent is hereby corrected as shown below:

| Column | Line | |
|--------|------|---|
| 2 | 32 | Change "as (1-2)" to --as (1-W2)--. |
| 17 | 24 | Change "veriable" to --variable--. |

Signed and Sealed this

Seventh Day of November, 2000

Attest:

Q. TODD DICKINSON

*Attesting Officer*     *Director of Patents and Trademarks*